US011780133B2

United States Patent
Ochiai et al.

(10) Patent No.: US 11,780,133 B2
(45) Date of Patent: Oct. 10, 2023

(54) METHOD FOR MANUFACTURING ARTICLE AND INJECTION MOLDING SYSTEM

(71) Applicant: CANON KABUSHIKI KAISHA, Tokyo (JP)

(72) Inventors: Takamichi Ochiai, Tokyo (JP); Kyosuke Yokotani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 17/549,282

(22) Filed: Dec. 13, 2021

(65) Prior Publication Data

US 2022/0184867 A1  Jun. 16, 2022

(30) Foreign Application Priority Data

Dec. 16, 2020 (JP) .................. 2020-208138

(51) Int. Cl.
*B29C 45/23* (2006.01)
*B29C 45/28* (2006.01)

(52) U.S. Cl.
CPC ........ *B29C 45/231* (2013.01); *B29C 45/2806* (2013.01)

(58) Field of Classification Search
CPC .... B29C 45/04; B29C 45/231; B29C 45/2806
See application file for complete search history.

(56) References Cited

U.S. PATENT DOCUMENTS

| | | |
|---|---|---|
| 2008/0029932 A1 | 2/2008 | Zietlow |
| 2012/0070532 A1 | 3/2012 | Ten |
| 2018/0009146 A1 | 1/2018 | Nakamura |

FOREIGN PATENT DOCUMENTS

| | | |
|---|---|---|
| JP | 50065956 U | 6/1975 |
| JP | 61085414 U | 6/1986 |
| JP | 06106558 A | 4/1994 |
| JP | H09262880 A | 10/1997 |
| JP | 2000334778 A | 12/2000 |
| JP | 2003-136561 A | 5/2003 |
| JP | 2003127186 A | 5/2003 |
| JP | 2009226936 A | 10/2009 |
| JP | 2011218705 A | 11/2011 |
| JP | 2012161922 A | 8/2012 |
| JP | 2017124496 A | 7/2017 |
| JP | 2018-103393 A | 7/2018 |
| JP | 2019081346 A | 5/2019 |

*Primary Examiner* — James Sanders
(74) *Attorney, Agent, or Firm* — Canon U.S.A., Inc. IP Division

(57) ABSTRACT

A method of manufacturing an article using injection molding includes a step of injecting resin from an injection nozzle having a valve pin via a resin flow path in a first mold (metal mold) into a cavity in the first mold, a step of inserting the valve pin into the resin flow path, extracting the valve pin from the resin flow path, starting to increase a distance between the injection nozzle and the first mold after extracting the valve pin, and a third step of, after starting to increase the distance between the injection nozzle and the first mold, injecting resin from the injection nozzle via a resin flow path in a second mold into a cavity in the second mold.

14 Claims, 13 Drawing Sheets

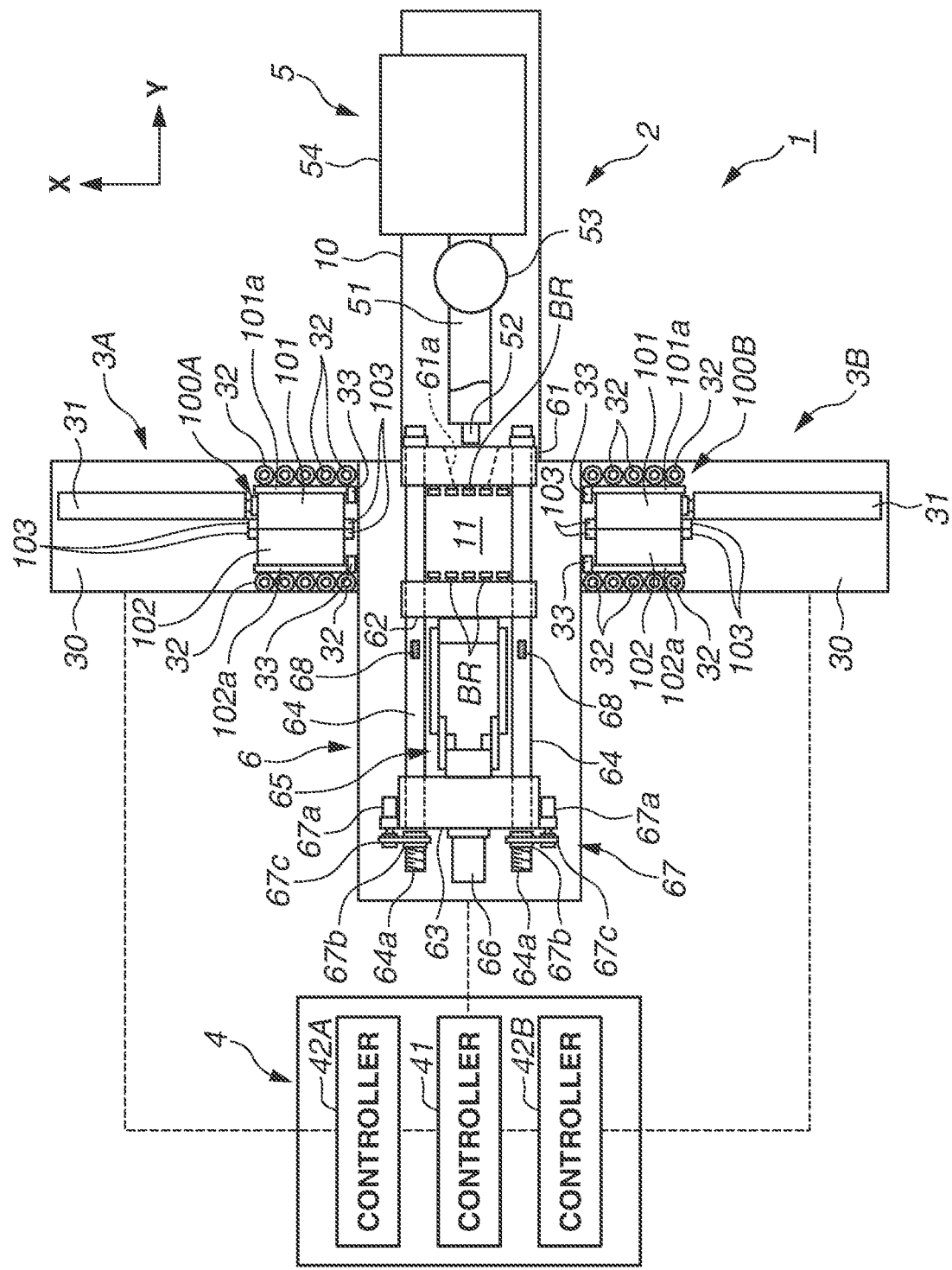

SECTION II-II

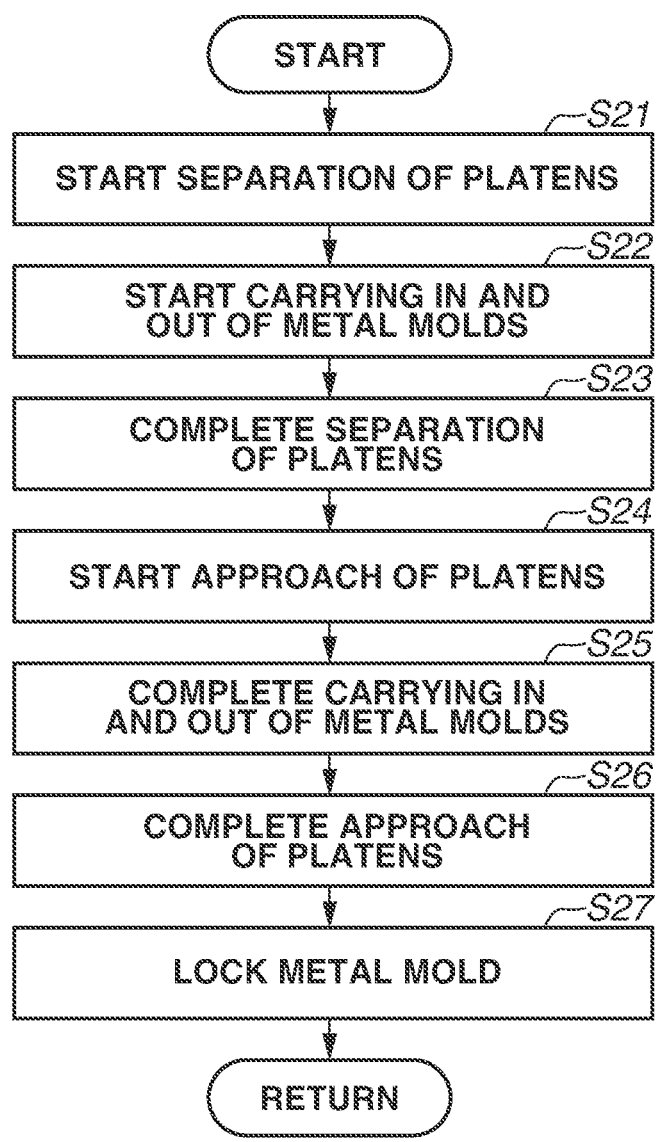

METHOD FOR MANUFACTURING ARTICLE AND INJECTION MOLDING SYSTEM

BACKGROUND

Field

The present disclosure relates to injection molding.

Description of the Related Art

In an injection molding system that performs injection molding, it is desirable to prevent resin from leaking from an injection nozzle. Japanese Patent Application Laid-Open No. 2019-081346 discusses that a valve pin provided in a nozzle closes a discharge port. Japanese Patent Application Laid-Open No. 2019-081346 also discusses that long stringy resin occurs between a metal mold and the nozzle.

The technique discussed in Japanese Patent Application Laid-Open No. 2019-081346 does not sufficiently consider the prevention of the leakage of resin.

SUMMARY

The present disclosure is directed to providing a technique advantageous in preventing leakage of resin.

According to an exemplary aspect, a method for manufacturing an article using injection molding includes a first step of injecting resin from an injection nozzle having a valve pin via a resin flow path in a first mold (metal mold) into a cavity in the first mold, a second step of, after the first step, inserting the valve pin into the resin flow path, extracting the valve pin from the resin flow path, and starting to increase a distance between the injection nozzle and the first mold after extracting the valve pin, and a third step of, after starting to increase the distance between the injection nozzle and the first mold, injecting resin from the injection nozzle via a resin flow path in a second mold into a cavity in the second mold.

According to another exemplary aspect, a method for manufacturing an article using injection molding includes a first step of injecting resin from an injection nozzle having a valve pin via a resin flow path in a mold into a cavity in the mold, and a second step of, after the first step, inserting the valve pin into the resin flow path in a state where the injection nozzle and the mold are contacting each other, and extracting the valve pin from the resin flow path, wherein the mold has a cold runner structure.

According to still another exemplary aspect, a method for manufacturing an article using injection molding includes a first step of injecting resin from an injection nozzle via a resin flow path in a mold having a valve pin into a cavity in the mold, and a second step of, after the first step, inserting the valve pin into a discharge port of the injection nozzle, and extracting the valve pin from the discharge port.

According to still yet another exemplary aspect, an injection molding system comprises an injection nozzle, a conveying mechanism configured to convey a plurality of molds, and an apparatus configured to open and close each of the plurality of molds, wherein the apparatus includes a first platen and a second platen, wherein the conveying mechanism conveys each of the plurality of molds to a position between the first platen and the second platen, wherein the injection nozzle includes a valve pin configured to open and close a resin flow path in the injection nozzle, and wherein in a case where the valve pin closes the resin flow path in the injection nozzle, the valve pin protrudes further than an end of the injection nozzle.

Further features will become apparent from the following description of exemplary embodiments with reference to the attached drawings.

BRIEF DESCRIPTION OF THE DRAWINGS

FIG. 1 illustrates an injection molding system.

FIGS. 10A and 10B illustrate flowcharts of a manufacturing method.

DESCRIPTION OF THE EMBODIMENTS

Figure 2A:
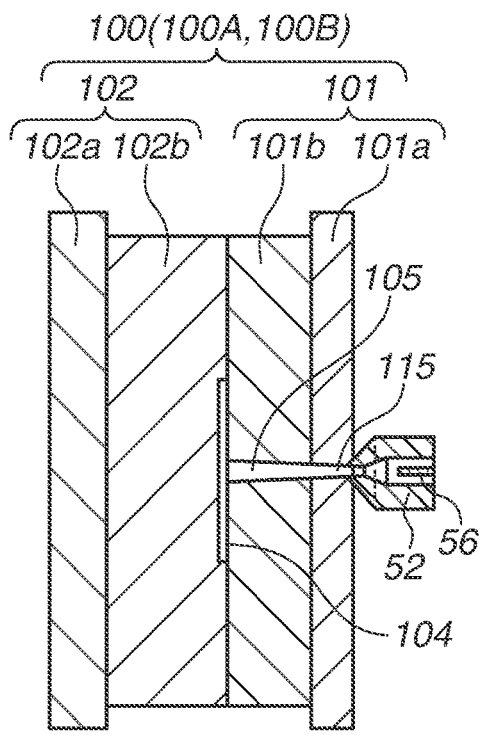
FIGS. 2A and 2B illustrate schematic diagrams illustrating configurations of an injection nozzle and a mold (metal mold).

Exemplary embodiments will be described below with reference to the drawings. Components common to a plurality of drawings are designated by common signs in the following description and the drawings.

Common components are described with reference to a plurality of drawings, and the descriptions of components designated by common signs are appropriately omitted.

FIG. 1 illustrates an injection molding system 1 according to exemplary embodiments. The injection molding system 1 includes a horizontal injection molding machine 2, conveying apparatuses 3A and 3B, and a control apparatus 4. The injection molding system 1 manufactures resin molded products while replacing a plurality of molds (metal molds) using the conveying apparatuses 3A and 3B in a single injection molding machine 2. A "resin molded product" refers to an article manufactured using injection molding.

The injection molding machine 2 includes an injection apparatus 5. The injection apparatus 5 includes an injection cylinder 51 and an injection nozzle 52. The injection nozzle 52 injects resin melted in the injection cylinder 51.

In the present exemplary embodiments, two metal molds 100A and 100B are used. The metal molds 100A and 100B are occasionally collectively referred to as a "metal mold 100". The conveying apparatuses 3A and 3B are occasionally collectively referred to as a "conveying mechanism 3". The conveying apparatuses 3A and 3B are used to convey a plurality of metal molds 100A and 100B.

The metal mold 100 is a set of a fixed metal mold 101 and a movable metal mold 102 that is opened and closed with respect to the fixed metal mold 101. Melted resin is injected into a cavity formed between the fixed metal mold 101 and the movable metal mold 102, thereby molding a resin molded product. Attachment plates 101a and 102a, respectively, are fixed to the fixed metal mold 101 and the movable metal mold 102. The attachment plates 101a and 102a are used to lock the metal mold 100 to a molding operation position 11 (a metal mold attachment position) in the injection molding machine 2.

The conveying apparatus 3A carries the metal mold 100A into and out of the molding operation position 11 in the injection molding machine 2. The conveying apparatus 3B carries the metal mold 100B into and out of the molding operation position 11. The conveying apparatus 3A, the injection molding machine 2, and the conveying apparatus 3B are placed next to each other in this order in an X-axis direction. That is, the conveying apparatuses 3A and 3B are placed to the left and right of the injection molding machine 2 by surrounding the injection molding machine 2 in the X-axis direction and are located opposite each other. The conveying apparatus 3A is placed adjacent to either a left or a right side of the injection molding machine 2, and the conveying apparatus 3B is placed adjacent to the other side. The molding operation position 11 is located between the conveying apparatuses 3A and 3B.

Both the conveying apparatuses 3A and 3B includes a frame 30, a conveying unit 31, a plurality of rollers 32, and a plurality of rollers 33. In another exemplary embodiment, both the conveying apparatuses 3A and 3B can be a carriage that conveys the metal mold 100 in a factory environment.

Each frame 30 forms a skeleton of the conveying apparatus 3A and the conveying apparatus 3B and supports the conveying unit 31 and the plurality of rollers 32 and 33. The conveying unit 31 reciprocates the metal mold 100 in the X-axis direction, thereby conveying the metal mold 100 into and conveying the metal mold 100 out of the molding operation position 11.

In the present exemplary embodiments, the conveying unit 31 is an electric cylinder using a motor as a driving source and includes a rod that advances and retreats with respect to the cylinder. The cylinder is fixed to the frame 30, and the fixed metal mold 101 is fixed to an end portion of the rod. In other exemplary embodiments, a fluidic actuator or an electric actuator can be used as the conveying unit 31. An electric actuator enables improving the accuracy of control of the position and the speed of the conveying unit 31 when conveying the metal mold 100. Examples of a fluidic actuator include a hydraulic cylinder or an air cylinder. Examples of an electric actuator include an electric cylinder, a rack and pinion mechanism using a motor as a driving source, or a ball screw mechanism using a motor as a driving source.

In the present exemplary embodiments, the conveying unit 31 is independently provided in each of the conveying apparatuses 3A and 3B. In another exemplary embodiment, a common supporting member that supports the metal molds 100A and 100B can be used, and a single common conveying unit 31 can be provided in the supporting member. The configuration in which the conveying unit 31 is independently provided in each of the conveying apparatuses 3A and 3B as in the present exemplary embodiments is advantageous in that it supports handling a scenario where movement strokes of the metal molds 100A and 100B when conveyed are different from each other (e.g., the widths the X-axis direction of the metal molds 100A and 100B are different from each other. The configuration in which the conveying unit 31 is independently provided in each of the conveying apparatuses 3A and 3B is also advantageous in that it supports handling a scenario where the thicknesses (the widths in a Y-axis direction) of the metal molds 100A and 100B are different from each other, and the metal molds 100A and 100B cannot be simultaneously conveyed.

The plurality of rollers 32 forms lines of rollers arranged in the X-axis direction. In the present exemplary embodiments, the plurality of rollers 32 forms two lines separately in the Y-axis direction. The plurality of rollers 32 rotates about rotational axis in a Z-axis direction, comes into contact with side surfaces of the metal mold 100 (side surfaces of the attachment plates 101a and 102a), and guides the movement of the metal mold 100 in the X-axis direction by supporting the metal mold 100 from the sides.

The plurality of rollers 33 forms lines of rollers arranged in the X-axis direction. In the present exemplary embodiments, the plurality of rollers 33 forms two lines separately in the Y-axis direction. The plurality of rollers 33 rotates about rotational axis in the Y-axis direction, supports a bottom surface of the metal mold 100 (bottom surfaces of the attachment plates 101a and 102a), and smooths the movement of the metal mold 100 in the X-axis direction by supporting the metal mold 100 from below.

The control apparatus 4 includes a controller 41 that controls the injection molding machine 2, a controller 42A that controls the conveying apparatus 3A, and a controller 42B that controls the conveying apparatus 3B. For example, each of the controllers 41, 42A, and 42B includes a processor such as a central processing unit (CPU), a storage device such as a random-access memory (RAM), a read-only memory (ROM), or a hard disk, and an interface connected to a sensor or an actuator. The processor executes a program stored in the storage device. An example of the program (control) executed by the controller 41 will be described below. The controller 41 is communicably connected to the controllers 42A and 42B, and provides an instruction regarding the conveyance of the metal mold 100 to the controller 42A or 42B. If the conveyance in or the conveyance out of the metal mold 100 is completed, the controller 42A or 42B transmits a signal indicating the completion of the operation to the controller 41. When an abnormality occurs, the controller 42A or 42B transmits an emergency stop signal to the controller 41.

In the present exemplary embodiments, a controller is provided for the injection molding machine 2 and both conveying apparatuses 3A and 3B. In another exemplary embodiment, a single controller can control the injection molding machine and both conveying apparatuses 3A and 3B. In another exemplary embodiment, a single controller can be used to control both conveying apparatus 3A and 3B to provide some additional certainty to the conveying apparatuses 3A and 3B cooperatively operating with each other. A single controller is provided at least for the injection molding machine 2, and a single controller is provided at least for the conveying apparatuses 3A and 3B, thereby improving the degree of freedom of the system.

Figure 2B:
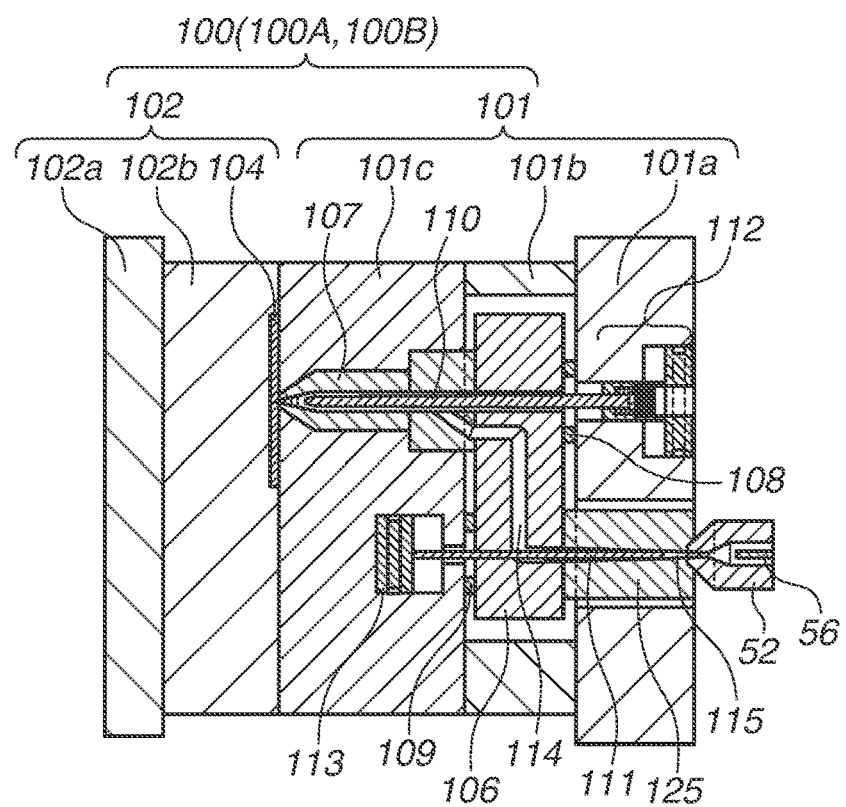

The configurations of the injection nozzle 52 and the metal mold 100 will be further described with reference to FIGS. 2A and 2B. FIGS. 2A and 2B illustrate cross-sectional views of the injection nozzle 52 and the metal mold 100 used in the injection molding system 1 according to the present exemplary embodiments.

As illustrated in FIGS. 2A and 2B, the injection nozzle 52 includes a valve pin 56 that can be located in a resin discharge port of the injection nozzle 52. The valve pin 56 is a rod-like or needle-like member and can also be referred to as a "needle".

In FIG. 2A, the metal mold 100 includes the attachment plate 101a of the fixed metal mold 101, the attachment plate 102a of the movable metal mold 102, a mold plate 101b of the fixed metal mold 101, and a mold plate 102b of the movable metal mold 102. The fixed metal mold 101 of the metal mold 100 is composed of the attachment plate 101a and the mold plate 101b. The movable metal mold 102 of the metal mold 100 is composed of the attachment plate 102a and the mold plate 102b.

The metal mold 100 includes a cavity 104 into which melted resin flows, and a sprue 115 and a cold runner 105 that serve as a resin flow path between the injection nozzle 52 and the cavity 104. The sprue 115 is a resin injection port of the metal mold 100. The metal mold 100 including the cold runner 105 has a structure (a cold runner structure) where, near a runner (the cold runner 105) as a resin flow path in the metal mold 100, a heating mechanism for heating resin in the runner is not provided.

Figure 10A:
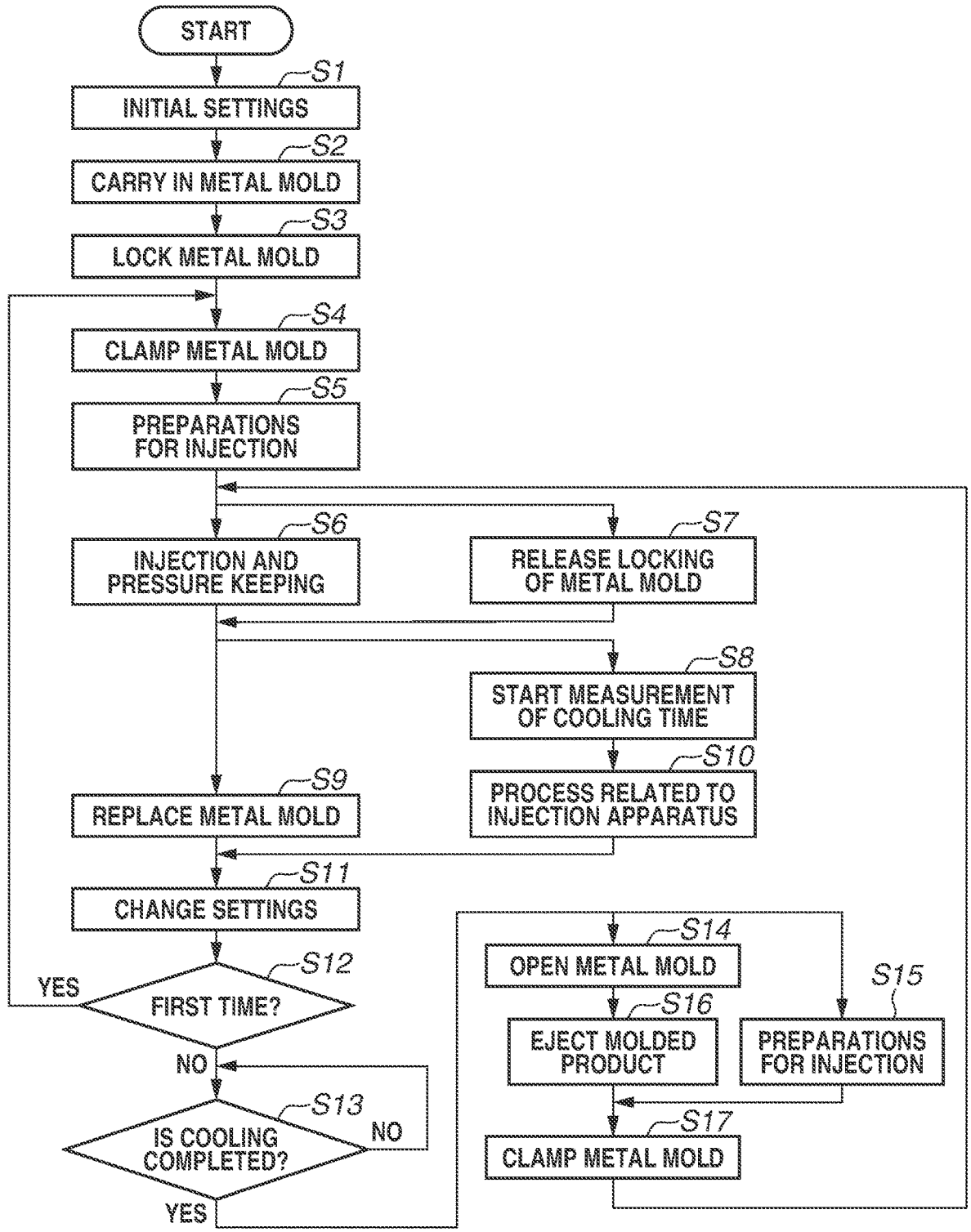

An embodiment where the metal mold 100 including a hot runner will now be described, while an embodiment where the metal mold 100 including the cold runner 105 will be described below in an example of a valve pin operation process in step S10 of FIG. 10A. FIG. 2B is a cross-sectional view of the metal mold 100 used in the injection molding system 1 according to the present exemplary embodiments.

FIG. 2B illustrates a cross-sectional view of the metal mold 100 used in the injection molding system 1 according to the present exemplary embodiments. In FIG. 2B, the metal mold 100 includes the attachment plate 101a of the fixed metal mold 101, the attachment plate 102a of the movable metal mold 102, a first mold plate 101b of the fixed metal mold 101, and a second mold plate 101c of the fixed metal mold 101. The metal mold 100 includes a mold plate 102b of the movable metal mold 102.

The fixed metal mold 101 of the metal mold 100 is composed of the attachment plate 101a, the first mold plate 101b, and the second mold plate 101c. The movable metal mold 102 of the metal mold 100 is composed of the attachment plate 102a and the mold plate 102b. The metal mold 100 includes a sprue 115, a hot runner 114, and a cavity 104 into which melted resin flows. The sprue 115 is a resin injection port of the metal mold 100. The metal mold 100 including the hot runner 114 has a structure (a hot runner structure) where, near a runner (the hot runner 114) as a resin flow path in the metal mold 100, a heating mechanism for heating resin in the runner is provided.

To achieve the hot runner structure, the metal mold 100 includes a sprue bush 125, a manifold 106, a body 107, and ring-shaped holding members 108 and 109 for securing the manifold 106 in the metal mold 100. The sprue 115 and the hot runner 114 serve as a resin flow path between the injection nozzle 52 and the cavity 104. The metal mold 100 includes a valve pin 110 that seals a resin injection port from the hot runner 114 to the cavity 104. The metal mold 100 includes a valve pin 111 that seals an injection port (the sprue 115) from the injection nozzle 52 to the hot runner 114. The valve pin 111 is a rod-like or needle-like member and can also be referred to as a "needle". A cylinder 112 drives the valve pin 110. A cylinder 113 drives the valve pin 111. The hot runner structure of the metal mold 100 is achieved by the sprue bush 125, the manifold 106, the body 107, the holding members 108 and 109, the valve pins 110 and 111, and the cylinders 112 and 113.

A method for manufacturing an article using injection molding includes an injection step of injecting resin from the injection nozzle 52 through the resin flow path in the metal mold 100 into the cavity 104 in the metal mold 100. The resin flow path in the metal mold 100 is the sprue 115 and/or the runner (the cold runner 105 or the hot runner 114). To manufacture a plurality of resin molded products, this injection step is repeated. In a first method, after the injection step is performed on the metal mold 100A, the metal mold 100A attached to the injection apparatus 5 can be replaced with the metal mold 100B, and the next injection step can be performed on the metal mold 100B. The conveying mechanism 3 provides for easy replacement of the metal molds 100A and 100B. In a second method, after the injection step is performed on the metal mold 100A, a resin molded product can be ejected from the metal mold 100A attached to the injection apparatus 5, and the next injection step can be performed on the metal mold 100A again.

The manufacturing method according to the present exemplary embodiments includes an intermediate step between a previous injection step and a subsequent injection step, where the manufacturing method is characterized by the intermediate step. Resin in the injection apparatus 5 can be replaced between the previous injection step and the subsequent injection step, but typically, common resin can be used in the previous injection step and the subsequent injection step. Typically, in the subsequent injection step, resin present in a resin flow path in the injection nozzle 52 in the intermediate step after the previous injection step is injected.

In the intermediate step, the valve pin 56 of the injection nozzle 52 can be inserted into the resin flow path in the metal mold 100 and the valve pin 56 of the injection nozzle 52 can be extracted from the resin flow path in the metal mold 100. Performance of this intermediate step can result in the resin remaining in the resin flow path in the metal mold 100 in the previous injection step being pushed into the metal mold 100 by the valve pin 56. Thus, it is possible to reduce the leakage of resin between the injection nozzle 52 and the metal mold 100. The resin flow path in the metal mold 100 into and from which the valve pin 56 is inserted and extracted is, for example, the sprue 115, but can be the runner (the cold runner 105 or the hot runner 114).

In the intermediate step, the valve pin 111 of the metal mold 100 can be inserted into the discharge port of the injection nozzle 52 and the valve pin 111 of the metal mold 100 extracted from the discharge port of the injection nozzle 52. Performance of this intermediate step can result in the resin remaining in the discharge port of the injection nozzle 52 in the previous injection step being pushed into the injection nozzle 52 by the valve pin 111. Thus, it is possible to reduce the leakage of resin between the injection nozzle 52 and the metal mold 100.

In the intermediate step, either or both of the valve pins 56 and 111 can be inserted and extracted. In the intermediate step, if both the valve pins 56 and 111 are inserted and extracted, the valve pin 56 can be inserted and extracted before or after the valve pin 111 is inserted and extracted. In an exemplary embodiment, insertion and extraction of the valve pin 56 occurs before insertion and removal of the valve pin 111.

If both the valve pins 56 and 111 are present, then in the intermediate step of an exemplary embodiment, the valve pins 56 and 111 should contact each other. In addition, the valve pin 56 can be extracted and/or the valve pin 111 extracted while maintaining a state where the valve pins 56 and 111 are contacting each other. An end of the valve pin 56 and an end of the valve pin 111 can be fitted to each other. In the intermediate step of the present exemplary embodiments, a state exists where a portion between the resin flow path in the injection nozzle 52 and the resin flow path (the cold runner 105 or the hot runner 114) in the metal mold 100 is closed. In another exemplary embodiment, in the intermediate step, if the valve pin 111 is inserted into and extracted from the injection nozzle 52, the valve pin 56 of the injection nozzle 52 need not be provided.

In an exemplary embodiment, the metal mold 100 used in the injection step before the intermediate step can have the cold runner structure or the hot runner structure. In an exemplary embodiment, the metal mold 100 used in the injection step after the intermediate step can have the cold runner structure or the hot runner structure. In another exemplary embodiment, the metal mold 100 used in the injection step before the intermediate step can have either the cold runner structure or the hot runner structure, and the metal mold 100 used in the injection step after the intermediate step can have the structure not used.

In the intermediate step, the distance between the injection nozzle 52 and the metal mold 100 is increased (the injection nozzle 52 and the metal mold 100 are separated from each other) to transition to the subsequent injection step. Since resin remaining near the boundary between the injection nozzle 52 and the metal mold 100 is reduced, it is possible to prevent the stringiness phenomenon of resin between the injection nozzle 52 and the metal mold 100 when the distance between the injection nozzle 52 and the metal mold 100 is increased.

In the present exemplary embodiments, increasing the distance between the injection nozzle 52 and the metal mold 100 is performed after the valve pin 56 is extracted from the cold runner 105. If the distance between the injection nozzle 52 and the metal mold 100 is increased when the valve pin 56 is inserted, there is a possibility of damaging the valve pin 56. If, however, the distance between the injection nozzle 52 and the metal mold 100 is increased when the valve pin 56 is extracted, the possibility of damaging the valve pin 56 can be reduced. For a similar reason, increasing the distance between the injection nozzle 52 and the metal mold 100 after the valve pin 111 is extracted from the resin flow path in the injection nozzle 52 is performed.

During a period from when the injection nozzle 52 is separated from the metal mold 100 to when the subsequent injection step is started, the valve pin 56 should block the discharge port of the injection nozzle 52. This enables preventing resin from leaking from the injection nozzle 52 in the intermediate step. For a similar reason, the valve pin 111 should block the injection port of the hot runner 114 during the period from when the injection nozzle 52 is separated from the metal mold 100 to when the subsequent injection step is started.

Figure 3:
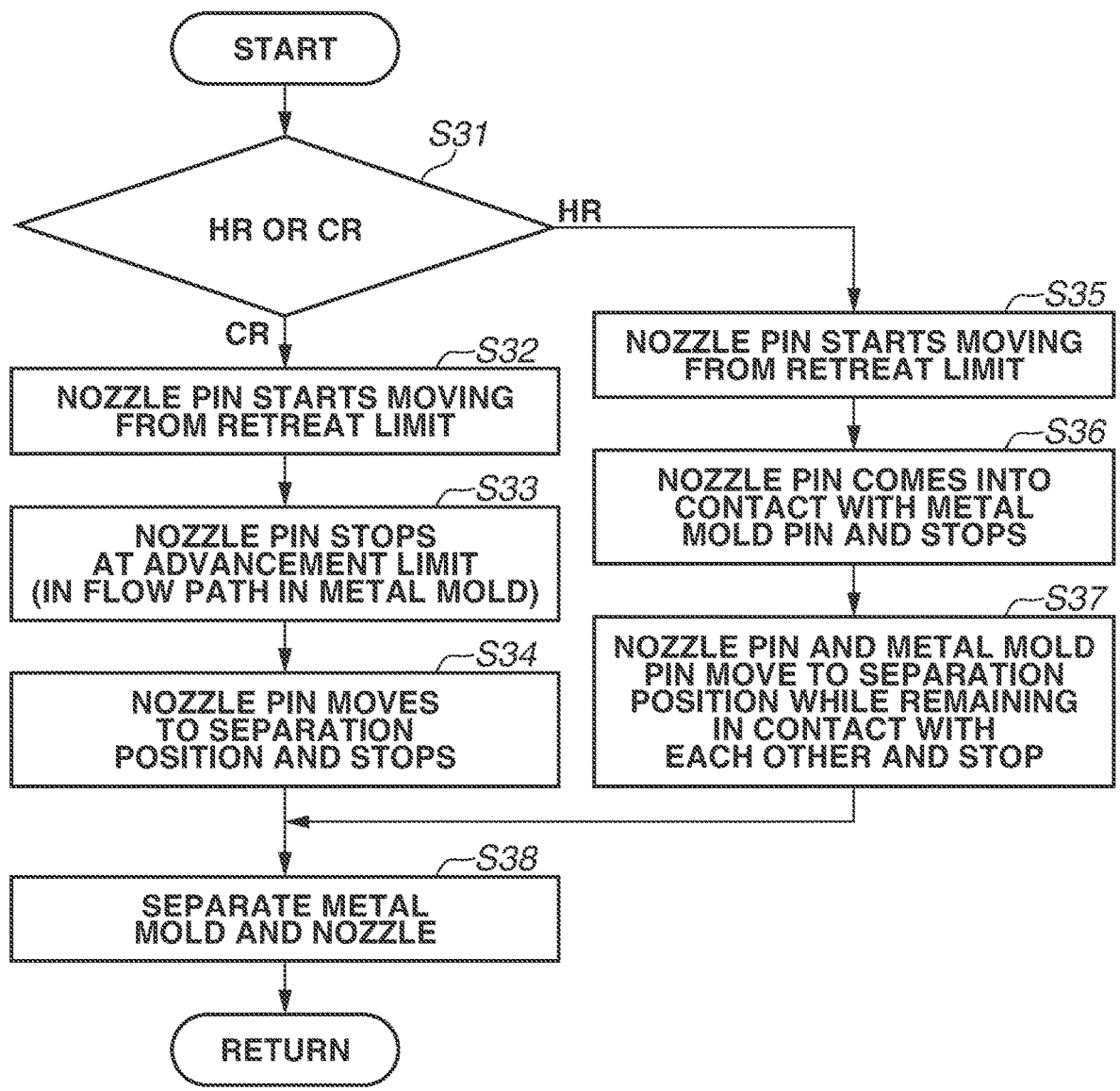
FIG. 3 illustrates a flowchart of an intermediate step.

The processing in the intermediate step will now be described with reference to FIG. 3. FIG. 3 illustrates a flowchart of a valve pin 56 operation process in a process related to the injection apparatus in step S10 of FIG. 10A. FIGS. 4A to 4D are diagrams illustrating an example of the operation of the valve pin 56. A description is provided with reference to steps in an example of the processing in FIG. 3 and states in FIGS. 4A to 4D. In FIG. 3, the valve pin 56 of the injection nozzle 52 is abbreviated as a "nozzle pin", and the valve pin 111 of the metal mold 100 is abbreviated as a "metal mold pin".

Figure 4A:
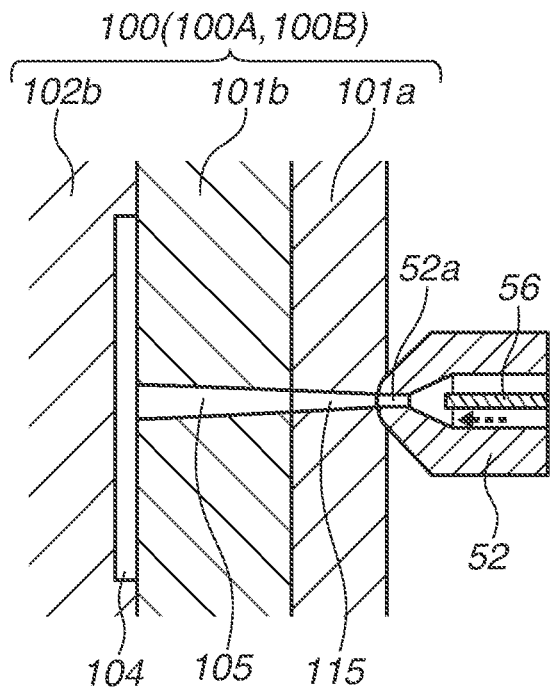
FIGS. 4A to 4D illustrate schematic diagrams of an intermediate step.

Turning to FIG. 3, in step S31, a determination is made with respect to whether metal mold 100 includes the cold runner (CR) or the hot runner (HR). If the metal mold 100 includes the cold runner (CR), the process proceeds to step S32. During an injection and pressure keeping step (not illustrated), the valve pin 56 stops at a retreat limit in the resin flow path in the injection nozzle 52. When the pressure keeping is completed, the valve pin 56 starts moving in a direction of closing a discharge port 52a of the injection nozzle 52. In step S32, the valve pin 56 starts moving from the retreat limit. FIG. 4A illustrates this operation.

Figure 4B:
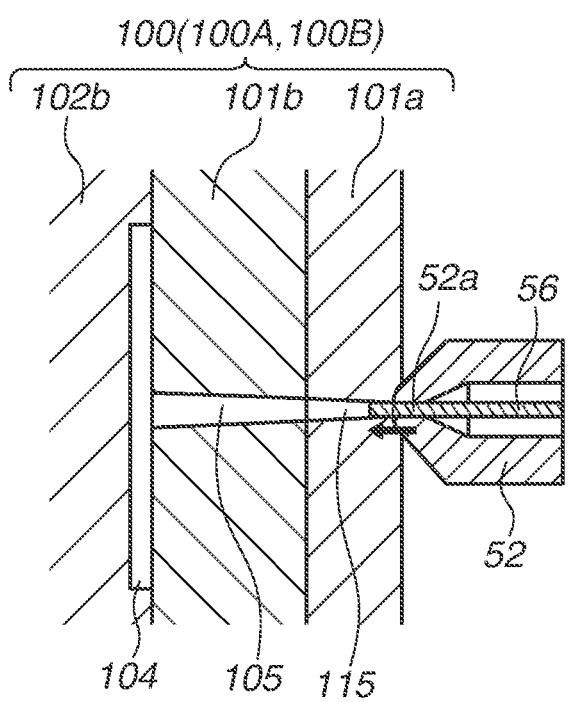

In step S33, the valve pin 56 stops at an advancement limit. FIG. 4B illustrates this operation. The valve pin 56 passes through the discharge port 52a of the injection nozzle 52, and the valve pin 56 is inserted into the cold runner 105 in the metal mold 100, which serves as the flow path, and stops. The amount of insertion of the valve pin 56 is adjusted by the resin capacity of the discharge port 52a of the injection nozzle 52.

Figure 4C:
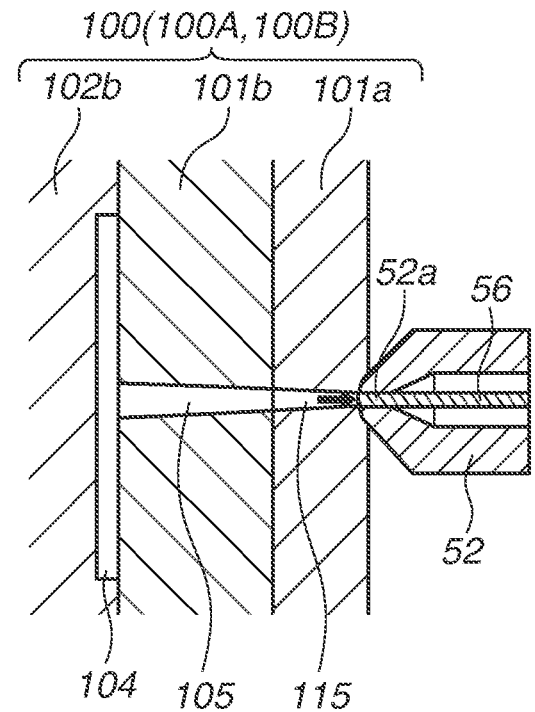

In step S34, the valve pin 56 is extracted from the sprue 115. FIG. 4C illustrates this operation. The valve pin 56 retreats in a direction of the injection nozzle 52, moves to a nozzle touch portion, and stops. The valve pin 56 is not inserted into the sprue 115, but the valve pin 56 blocks the discharge port 52a of the injection nozzle 52. The position of the valve pin 56 at this time is referred to as a "separation position".

Figure 4D:
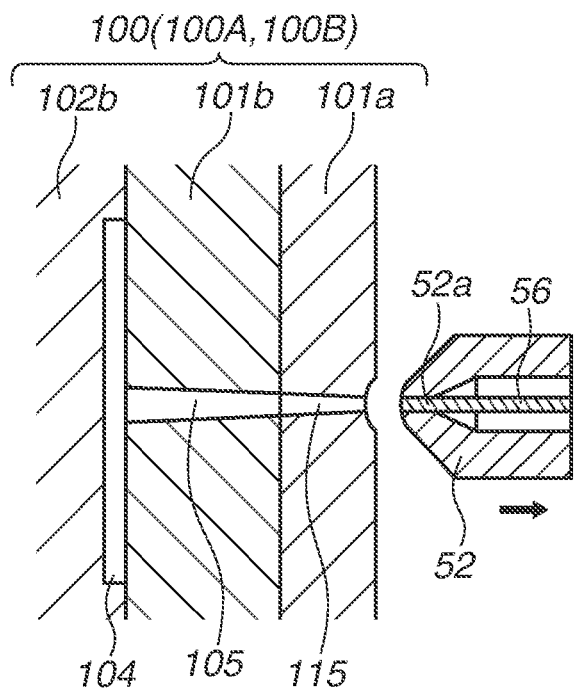

In step S38, the injection nozzle 52 retreats in the state where the valve pin 56 blocks the discharge port 52a of the injection nozzle 52. That is, the distance between the injection nozzle 52 and the metal mold 100 is increased. FIG. 4D illustrates this operation. The operation separates the injection nozzle 52 from the metal mold 100. Thereafter, the valve pin 56 remains at the separation position until the subsequent injection step starts. When the injection step starts, the valve pin 56 moves from the separation position to the retreat limit, and resin is injected from the discharge port 52a of the injection nozzle 52.

Figure 5A:
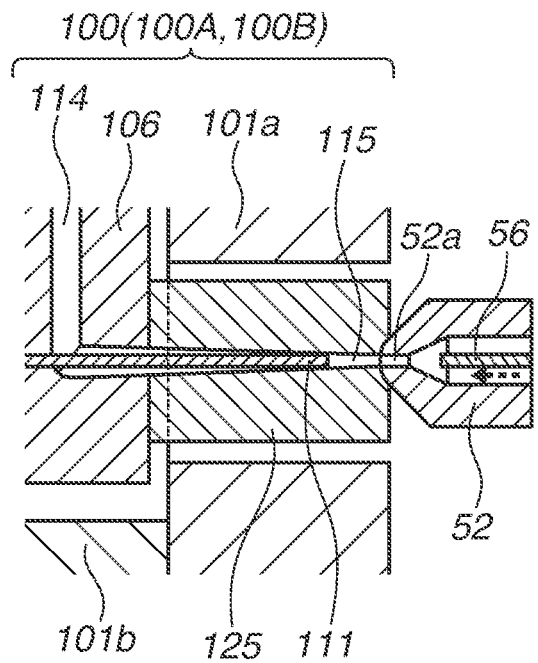
FIGS. 5A to 5D illustrate schematic diagrams of an intermediate step.
Figure 5B:
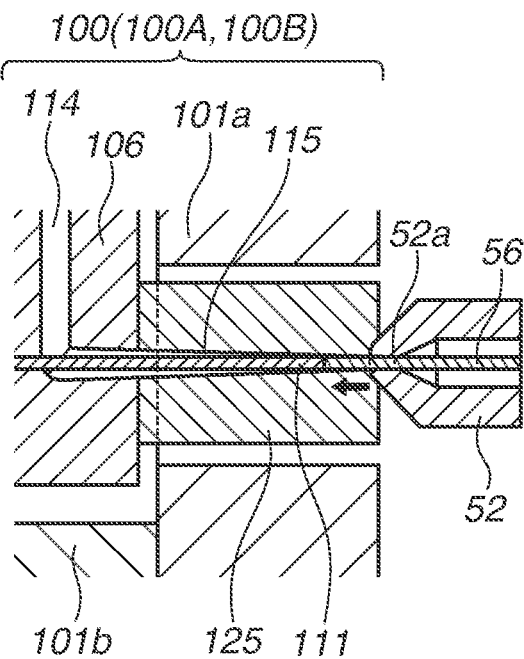
Figure 5C:
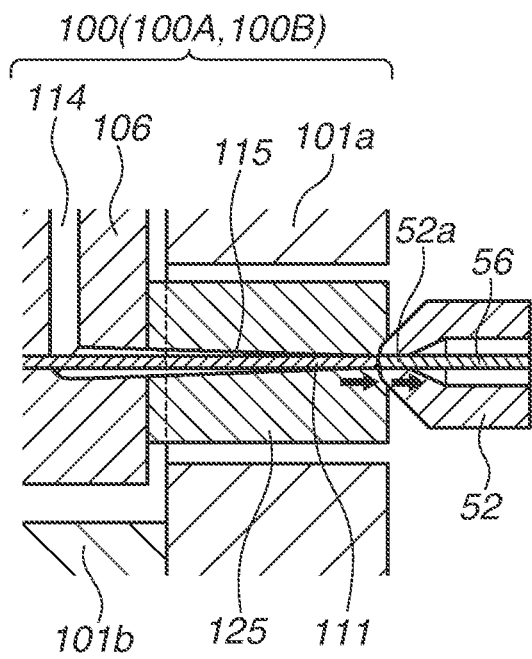

A description will now be provided, with reference to FIG. 3 and states in FIGS. 5A to 5C, of an example of an exemplary embodiment where the operation of the valve pin 56 if the metal mold 100 includes the hot runner.

In step S35, the valve pin 56 starts moving from the retreat limit. FIG. 5A illustrates this operation. During the injection and pressure keeping step (not illustrated), the valve pin 56 stops at the retreat limit in the resin flow path in the injection nozzle 52. When the pressure keeping is completed, the valve pin 56 starts moving in a direction of closing the discharge port 52a of the injection nozzle 52.

In step S36, the valve pin 56 contacts the valve pin 111 and stops. FIG. 5B illustrates this operation. The valve pin 56 passes through the discharge port 52a of the injection nozzle 52, the valve pin 56 is inserted into the resin flow path (the sprue 115) in the metal mold 100, and the valve pin 56 contacts the valve pin 111, and stops.

In step S37, the valve pin 56 is extracted from the sprue 115. FIG. 5C illustrates this operation. The valve pins 56 and 111 move to the separation position while remaining in close contact with each other and stop. The valve pin 56 retreats in the direction of sealing the discharge port 52a of the injection nozzle 52, the valve pin 111 advances in the direction of sealing the sprue 115, and the valve pins 56 and 111 move to the separation position, i.e., the nozzle touch portion, and stop. Flow then proceeds to step S38, which is described above.

Figure 5D:
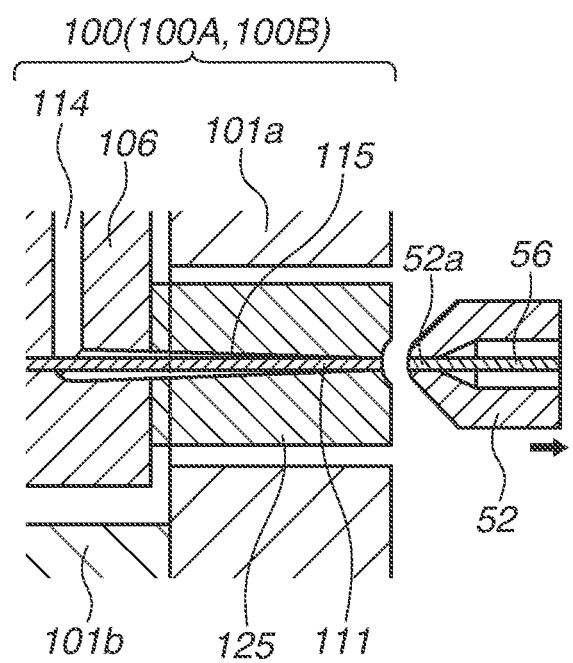

FIG. 5D illustrates this operation, which separates the injection nozzle 52 from the metal mold 100.

Thereafter, the valve pin 56 remains at the separation position until the subsequent injection step starts. When the subsequent injection step starts, the valve pin 56 moves from the separation position to the retreat limit, and resin is injected from the discharge port 52a of the injection nozzle 52.

In the above-described embodiment, an example was provided where the valve pin 56 is on the molding machine 2 side, and the valve pin 111 is on the metal mold 100 side. In another exemplary embodiment, operation of the valve pins 56 and 111 can be reversed. This operation will be described with reference to FIG. 3 and states in FIGS. 6A to 6F.

Figure 6A:
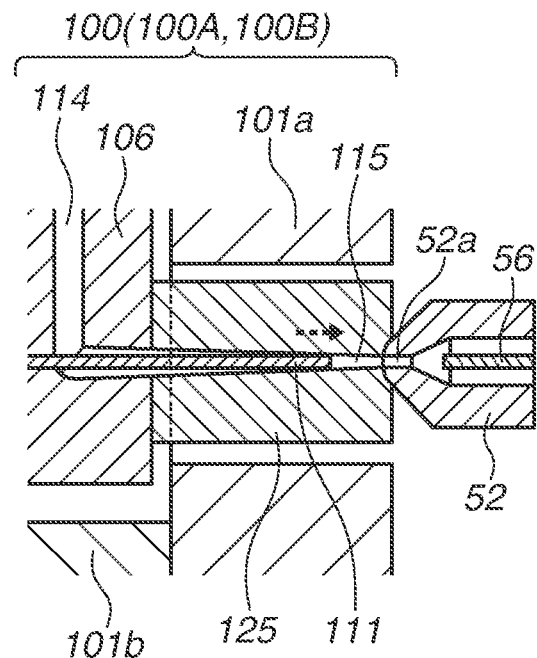
FIGS. 6A to 6D illustrate schematic diagrams of an intermediate step.

In step S35 in FIG. 3, the valve pin 56 starts moving from the retreat limit. FIG. 6A illustrates this operation. During the injection and pressure keeping step, the valve pin 111 stops at a retreat limit in the resin flow path of the hot runner 114. When the pressure keeping is completed, the valve pin 111 starts moving in the direction of closing the resin flow path of the hot runner 114.

Figure 6B:
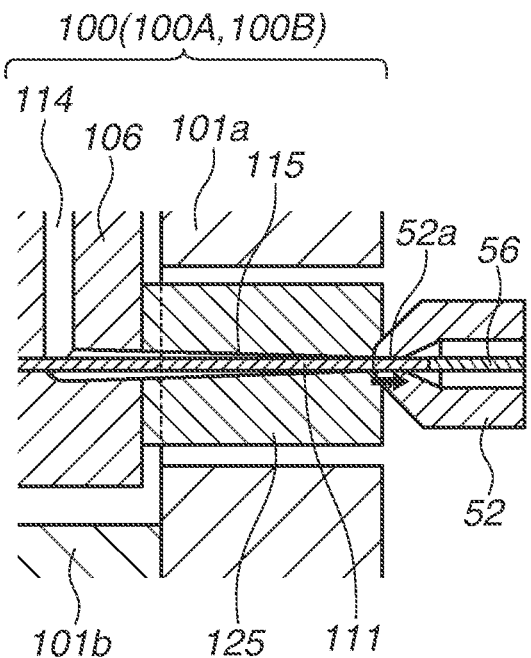

In step S36, the valve pin 111 contacts the valve pin 56 and stops. FIG. 6B illustrates this operation. The valve pin 111 passes through the resin flow path of the hot runner 114, is inserted into the discharge port 52a of the injection nozzle 52, contacts the valve pin 56, and stops.

Figure 6C:
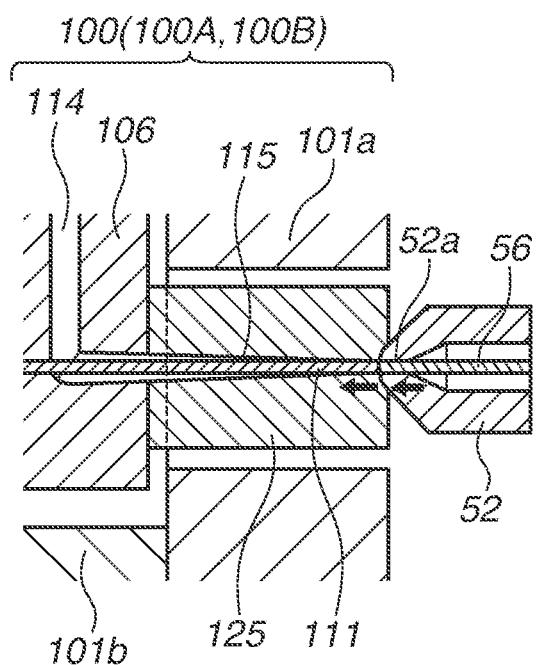
Figure 6D:
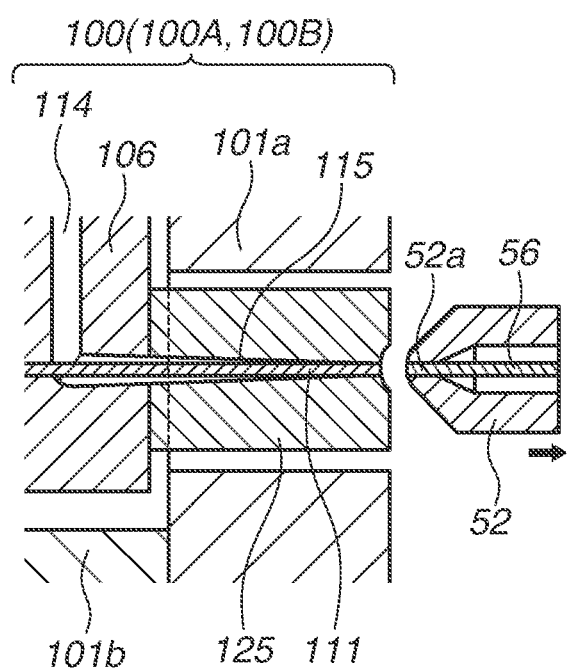

In step S37, the valve pins 56 and 111 move to the separation position while remaining in close contact with each other and stop. FIG. 6C illustrates this operation. The valve pin 56 retreats in the direction of the sprue bush 125, the valve pin 111 advances in the direction of the discharge port 52a of the injection nozzle 52, and the valve pins 56 and 111 move to the separation position, i.e., the nozzle touch portion, and stop.

Figure 7A:
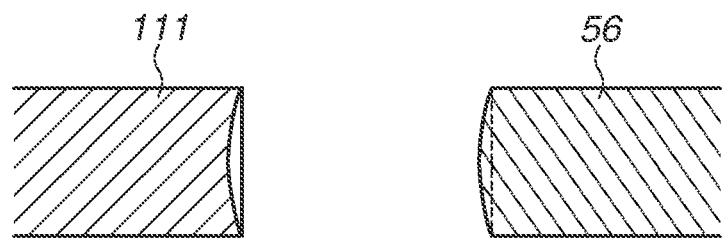
FIGS. 7A to 7C illustrate schematic diagrams of shapes of ends of valve pins.
Figure 7B:
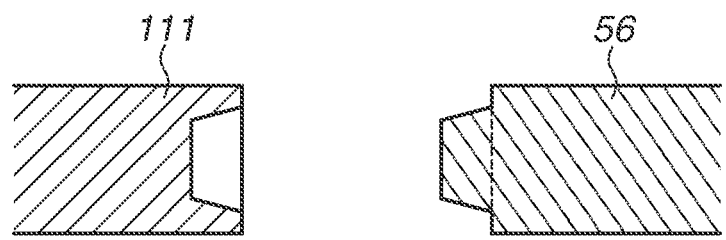
Figure 7C:

In the above-described exemplary embodiments, the shapes of the ends of the valve pins 56 and 111 are flat surfaces. In another exemplary embodiment, the shapes of the ends of the valve pins 56 and 111 can be shapes other than flat surfaces. For example, as illustrated in FIG. 7A, the valve pin 56 can have a curved surface shape, such as a convex surface, and the valve pin 111 can have a curved surface shape, such as a concave surface. In another exemplary embodiment, as illustrated in FIG. 7B, the valve pin 56 can have a conical shape, and the valve pin 111 can have an inverted conical shape. In still yet another exemplary embodiment, as illustrated in FIG. 7C, projection shapes can be formed on both sides by adjusting surface roughness of the valve pins 56 and 111.

FIGS. 7A and 7B illustrate examples where the valve pin 56 has a convex surface, and the valve pin 111 has a concave surface. In another exemplary embodiment, the convex and the concave shapes can be reversed. As described above, it is possible to prevent the leakage of resin as long as the end of the valve pin 56 and the end of the valve pin 111 are fitted to each other.

Figure 8A:
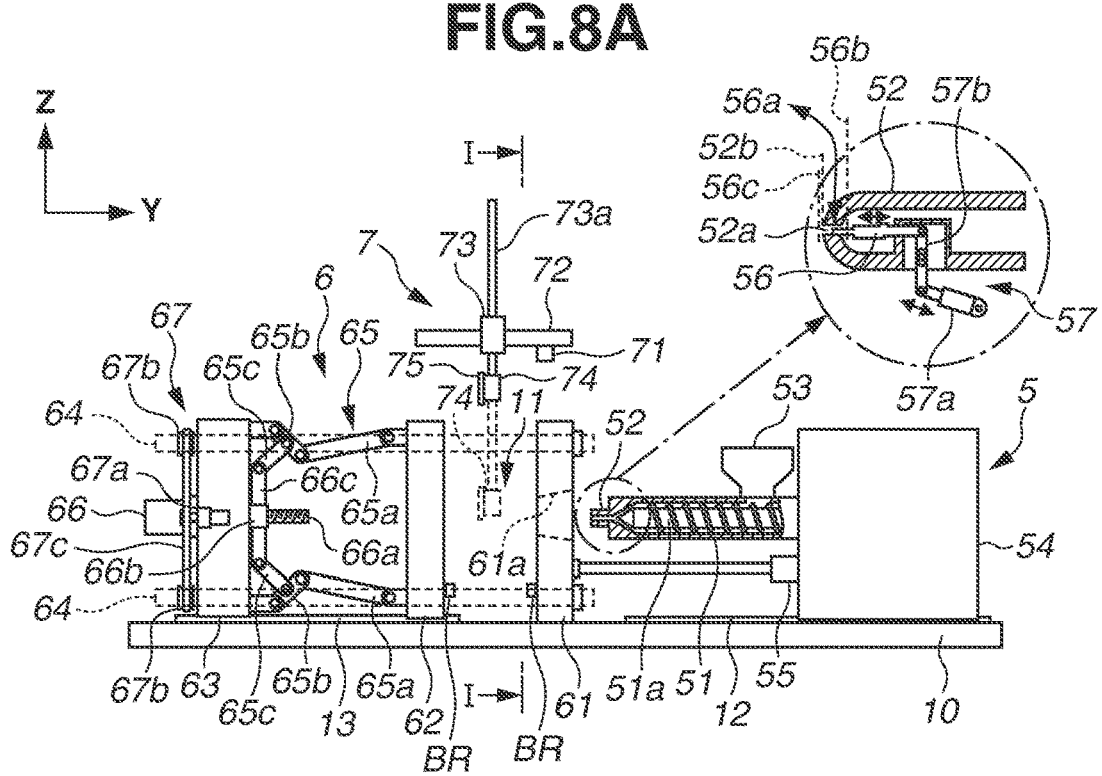
FIGS. 8A and 8B illustrate schematic diagrams of the injection molding system.
Figure 8B:
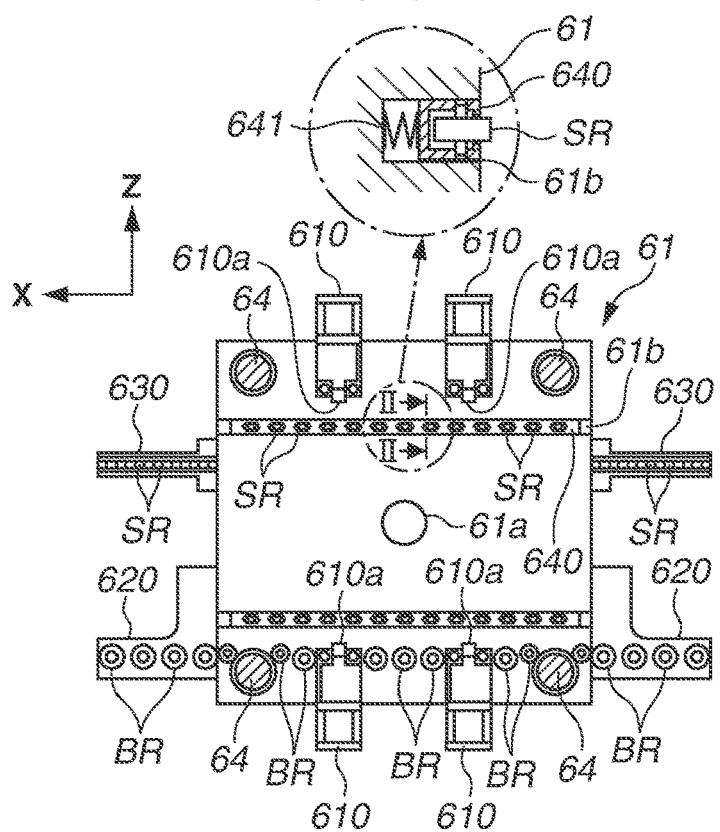
Figure 9:
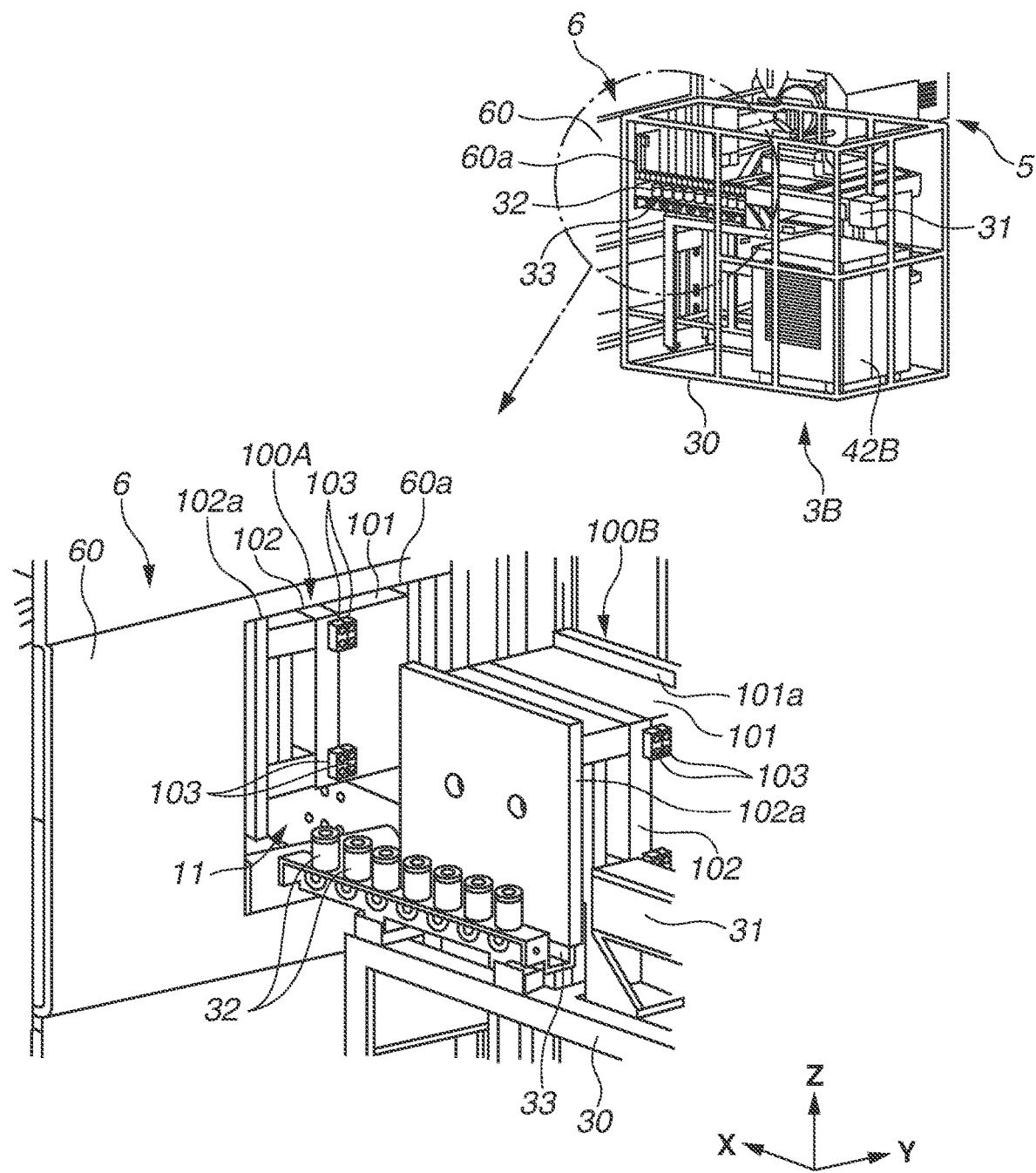
FIG. 9 illustrate a schematic diagram of the injection molding system.

A configuration of the injection molding machine 2 according to an exemplary embodiment will now be described with reference to FIGS. 8A to 9 and FIG. 1. FIG. 8A illustrates a side view of the injection molding machine 2. FIG. 8B illustrates an end view of a fixed platen 61 and is a cross-sectional view along an I-I line illustrated in FIG. 8A. FIG. 9 illustrates a partial perspective view illustrating the configuration of the periphery of the molding operation position 11.

As illustrated in FIG. 1 and FIG. 8A, the injection molding machine 2 includes the injection apparatus 5, a mold clamping apparatus 6, and an ejection machine 7 that ejects a resin molded product. The injection apparatus 5 and the mold clamping apparatus 6 are mounted on a frame 10 in the Y-axis direction.

The injection apparatus 5 includes the injection cylinder 51 extending in the Y-axis direction. The injection cylinder 51 includes a heating device (not illustrated) such as a band heater that melts resin supplied from a hopper 53. The injection cylinder 51 includes a built-in screw 51a. The plasticization of resin to be supplied into the injection cylinder 51 can be measured by the rotation of the screw 51a. Movement of the screw 51a in its axial direction (the Y-axis direction) results in melted resin being injected from the injection nozzle 52.

The injection nozzle 52 can be a shut-off nozzle with a discharge port that can be opened and closed. While a shut-off nozzle is described herein, any type of nozzle that would enable practice of the exemplary embodiment(s) is applicable.

FIG. 8A illustrates an example of the shut-off nozzle according to the present embodiments. In an opening/closing mechanism 57 of the shut-off nozzle, the valve pin 56 that opens and closes the discharge port 52a is provided. The valve pin 56 is linked to an actuator 57a (a cylinder) through a link 57b. Operation of the actuator 57a results in operating of the valve pin 56, and the valve pin 56 opens and closes the discharge port 52a.

FIG. 8A illustrates the position of an end 56a of the valve pin 56 in the state where the valve pin 56 closes the resin flow path (the discharge port 52a) in the injection nozzle 52. If the valve pin 56 moves to the retreat limit, the valve pin 56 enters the state where the valve pin 56 opens the resin flow path (the discharge port 52a). The end 56a of the valve pin 56 then moves to a position 56b.

FIG. 8A illustrates the position of an end 52b of the injection nozzle 52 in the state where the valve pin 56 opens the resin flow path (the discharge port 52a). If the valve pin 56 moves to the advancement limit, the end 56a of the valve pin 56 moves to a position 56c. When the valve pin 56 closes the resin flow path (the discharge port 52a) in the injection nozzle 52, the valve pin 56 protrudes beyond the end 52b of the injection nozzle 52 when the valve pin 56 opens the resin flow path (the discharge port 52a) in the injection nozzle 52. This enables the insertion of the valve pin 56 into the sprue 115 in the metal mold 100 as described above.

The injection cylinder 51 is supported by a driving unit 54. In the driving unit 54, a plasticization measurement motor (not illustrated) that rotates the screw 51a, and an injection motor (not illustrated) that causes the screw 51a to advance and retreat in its axial direction are provided. The driving unit 54 can advance and retreat in the Y-axis direction along a rail 12 on the frame 10. In the driving unit 54, an actuator (e.g., an electric cylinder) 55 that causes the entirety of the injection apparatus 5 to advance and retreat in the Y-axis direction is provided.

The mold clamping apparatus 6 is an apparatus that clamps the metal mold 100 and opens and closes the metal mold 100. In the present exemplary embodiments, the mold clamping apparatus 6 is a toggle mold clamping apparatus. However, any apparatus that would enable practice of the present exemplary embodiments can be used as a clamping apparatus. In the mold clamping apparatus 6, a fixed platen 61, a movable platen 62, and a movable platen 63 are placed in order in the Y-axis direction. A plurality (four an exemplary embodiment) tie bars 64 pass through the platens 61 to 63. Each tie bar 64 is a shaft extending in the Y-axis direction, and one end portion of a tie bar 64 is fixed to the fixed platen 61. Each tie bar 64 is inserted via a through hole formed in the movable platen 62. The other end portion of a tie bar 64 is fixed to the movable platen 63 via an adjustment mechanism 67. The movable platens 62 and 63 can move in the Y-axis direction along a rail 13 on the frame 10, and the fixed platen 61 is fixed to the frame 10.

A toggle mechanism 65 is provided between the movable platens 62 and 63. The toggle mechanism 65 is a mechanism for causing the movable platen 62 to advance and retreat with respect to the movable platen 63 (i.e., with respect to the fixed platen 61) in the Y-axis direction. The toggle mechanism 65 includes links 65a to 65c. The links 65a are linked to the movable platen 62 in a rotationally movable manner. The links 65b are linked to the movable platen 63 in a rotationally movable manner. The links 65a and 65b are linked to each other in a rotationally movable manner. The links 65c are linked to the links 65b in a rotationally movable manner. The links 65c are also linked to an arm 66c in a rotationally movable manner.

The arm 66c is fixed to a ball nut 66b. The ball nut 66b is engaged with a ball screw shaft 66a extending in the Y-axis direction and advances and retreats in the Y-axis direction by the rotation of the ball screw shaft 66a. The ball screw shaft 66a is rotatably supported by the movable platen 63, and a motor 66 is supported by the movable platen 63. The motor 66 rotates the ball screw shaft 66a. The amount of rotation of the motor 66 is detected by a sensor (not illustrated), such as a rotary encoder. The amount of rotation of the motor 66 is detected while the motor 66 is driven, making it possible to clamp the metal mold 100, and open and close the metal mold 100.

The injection molding machine 2 includes sensors 68 that measure the mold clamping force. In the present exemplary embodiments, the sensors 68 are strain gauges provided in the tie bars 64. However, any type of sensor that would enable practice of the present exemplary embodiments is applicable. The sensors 68 detect the strains of the tie bars 64 and calculate the mold clamping force.

The adjustment mechanism 67 includes nuts 67b rotatably supported by the movable platen 63, a motor 67a as a driving source, and a transmission mechanism (a belt transmission mechanism in this case) that transmits the driving force of the motor 67a to the nuts 67b. The tie bars 64 are engaged with the nuts 67b through holes formed in the movable platen 63. The nuts 67b are rotated, whereby the engagement positions in the Y-axis direction of the nuts 67b and the tie bars 64 change. That is, the fixed position of the movable platen 63 relative to the tie bars 64 changes. This can change the distance between the movable platen 63 and the fixed platen 61 and adjust the mold clamping force. The amount of rotation of the motor 67a is detected by a sensor (not illustrated) such as a rotary encoder. The motor 67a is driven while the amount of rotation of the motor 67a is detected, which results in being able to change the fixed position of the movable platen 63 relative to the tie bars 64 from an initial position to any position with higher accuracy.

The molding operation position 11 is an area between a pair of platens (the fixed platen 61 and the movable platen 62). The metal mold 100 introduced into the molding operation position 11 is located between the fixed platen 61 and the movable platen 62 and clamped. Movement of the movable platen 62 causes the metal mold 100 to open and close based on the movement of the movable metal mold 102.

FIG. 8B illustrates an opening portion 61a through which the injection nozzle 52 advances and retreats that is formed in a center portion of the fixed platen 61. A plurality of rollers BR is rotatably supported on a surface on the movable platen 62 side (referred to as an "inner surface") of the fixed platen 61. The plurality of rollers BR rotates about rotational axis in the Y-axis direction, supports the bottom surface (the bottom surface of the attachment plate 101a) of the metal mold 100, and smooths the movement of the metal mold 100 in the X-axis direction by supporting the metal mold 100 from below. A roller supporting body 620 is fixed to either side in the X-axis direction of the fixed platen 61. The plurality of rollers BR is also supported by the roller supporting bodies 620.

Grooves 61b extending in the X-axis direction are formed on the inner surface of the fixed platen 61. Two grooves 61b are formed separately one above the other. A roller unit 640 is provided in each groove 61b. A plurality of rollers SR is rotatably supported in the roller unit 640. The plurality of rollers SR rotates about a rotational axis in the Z-axis direction, contacts a side surface of the metal mold 100 (a side surface of the attachment plate 101a), and guides the movement of the metal mold 100 in the X-axis direction by supporting the metal mold 100 from the side.

As illustrated in a cross-sectional view along a II-II line, the roller unit 640 is located at the position where the rollers SR protrude from the groove 61b by the biasing of a spring 641. When the metal mold 100 is clamped, the roller unit 640 retreats into the groove 61b and is located at a position where the rollers SR do not protrude from the groove 61b. When the metal mold 100 is replaced, the roller unit 640 can prevent the metal mold 100 and the inner surface of the fixed platen 61 from contacting each other and damaging the inner surface. When the metal mold 100 is clamped, the roller unit 640 does not prevent the inner surface of the fixed platen 61 and the metal mold 100 from coming into close contact with each other.

A roller supporting body 630 is fixed to either side in the X-axis direction of the fixed platen 61. The plurality of rollers SR is also supported by the roller supporting bodies 630.

With the rollers BR and SR as described above, it is possible to convey the metal mold 100 quickly and smoothly when the metal mold 100 is conveyed between the injection molding machine 2 and the conveying apparatus 3A or 3B.

In the fixed platen 61, a plurality of fixing mechanisms (clamps) 610 that locks the fixed metal mold 101 to the fixed platen 61 is provided. Each clamp 610 includes an engagement portion 610a that engages with the attachment plate 101a, and also includes a built-in actuator (not illustrated) that moves the engagement portion 610a between an engagement position and an engagement release position. The actuator is a fluidic actuator, such as a hydraulic actuator or an air actuator. An electromagnetic clamp can be used as a mechanism for fixing the metal mold 100. A current is applied to a coil, whereby the electromagnetic clamp can magnetize and demagnetize a magnetic material inside the coil in a relatively short time. This enables the attachment and detachment of the metal mold 100. In a case where the metal mold 100 is frequently replaced, a fluidic actuator can be more advantageous.

In general, an electromagnetic clamp performs magnetization and demagnetization by instantaneously applying charges accumulated in a large-capacitance capacitor to a coil. However, an issue can occur where a current flowing through the coil is very large, and if the magnetization and the demagnetization are repeated many times, the coil and the magnet can gradually generate heat. The magnetic force of the magnet weakens as the temperature rises, and ultimately, the magnet loses the magnetic force. Thus, a situation where the coil and the magnet are heated is undesirable. The transmission of heat to a metal mold can influence the quality of a resin molded product. As a countermeasure against this, a method exists for applying cooling water to the electromagnetic clamp. This method, however, can be disadvantageous in terms of power usage and equipment cost. Thus, in a case where the metal mold 100 is frequently replaced, a fluidic actuator can be advantageous.

The movable platen 62 also includes a plurality of rollers BR, roller supporting bodies 620 and 630, roller units 640, and fixing mechanisms 610 that lock the movable metal mold 102 as provided for the fixed platen 61.

In general, a door is provided near a mold clamping apparatus. When a metal mold is replaced, replacing the metal mold occurs with the door open. In the present exemplary embodiments, it is assumed that the metal mold 100 is frequently replaced, and therefore, a configuration in which a door is opened and closed is inconvenient.

Turning to FIG. 9, in the present exemplary embodiments, the mold clamping apparatus 6 is surrounded by a cover (exterior plate) 60, but an opening portion 60a through which the metal mold 100 passes is formed on each side of the molding operation position 11 to replace the metal mold 100. The opening portion 60a is always open, and the metal mold 100 can be freely placed into and removed from the molding operation position 11. In the opening portion 60a, a slide door that is manually opened and closed can be provided so that the opening portion 60a can be closed. The opening portion 60a can then be closed by the slide door when preparation work, such as replacing the metal mold 100 with another metal mold, is performed.

FIG. 9 also illustrates an example of the external appearance of the conveying apparatus 3B. A door can be provided in the frame 30, thereby isolating the inside and outside of the frame 30. While the controller 42B is placed in a lower portion of the conveying apparatus 3B in the example of FIG. 9, each of the controllers 42A, 42B, and 41 can be placed anywhere in the injection molding system 1.

As a method for ejecting a resin molded product, a method for causing an ejector valve pin of a metal mold to operate, thereby automatically dropping the resin molded product or a method for manually ejecting the resin molded product by an operator can be employed. Referring back to FIG. 8A, a mechanism for ejecting the resin molded product from the movable metal mold 102 that is opened will be described with respect to the ejection machine 7.

The ejection machine 7 includes a rail 71 extending in the X-axis direction and a movable rail 72 that can move in the X-axis direction on the rail 71. The movable rail 72 extends in the Y-axis direction, and a slider 73 is provided on the movable rail 72. The slider 73 has a function of moving in the Y-axis direction, guided by the movable rail 72, and also has a function of causing a rise-and-fall shaft 73a to rise and fall in the Z-axis direction. In a lower end portion of the rise-and-fall shaft 73a, a suction head 74 is provided. A chuck plate 75 specialized in the resin molded product is attached to the suction head 74.

After mold opening, the ejection machine 7 moves, using the rail 71, the movable rail 72, and the slider 73, the suction head 74 to a position between the fixed metal mold 101 and the movable metal mold 102 as indicated by dashed lines in FIG. 8A. The ejection machine 7 then suctions the resin molded product, and conveys the resin molded product from the mold. While an ejection machine using a suction method is described herein, this is not seen to be limiting. In another exemplary embodiment, an ejection machine using a method for mechanically securing the resin molded product can be employed.

Figure 11:
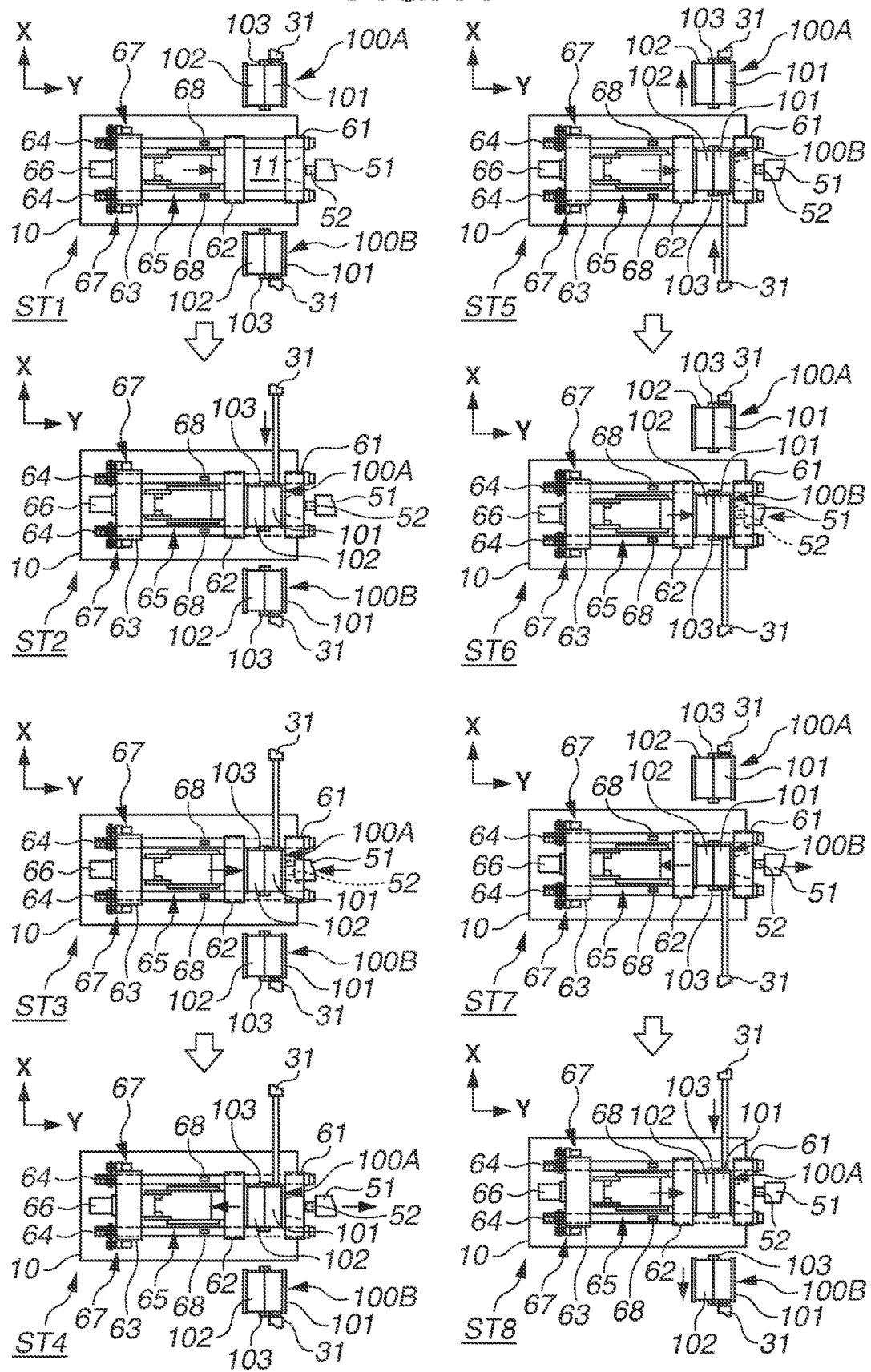
FIG. 11 illustrates a manufacturing method.
Figure 12:
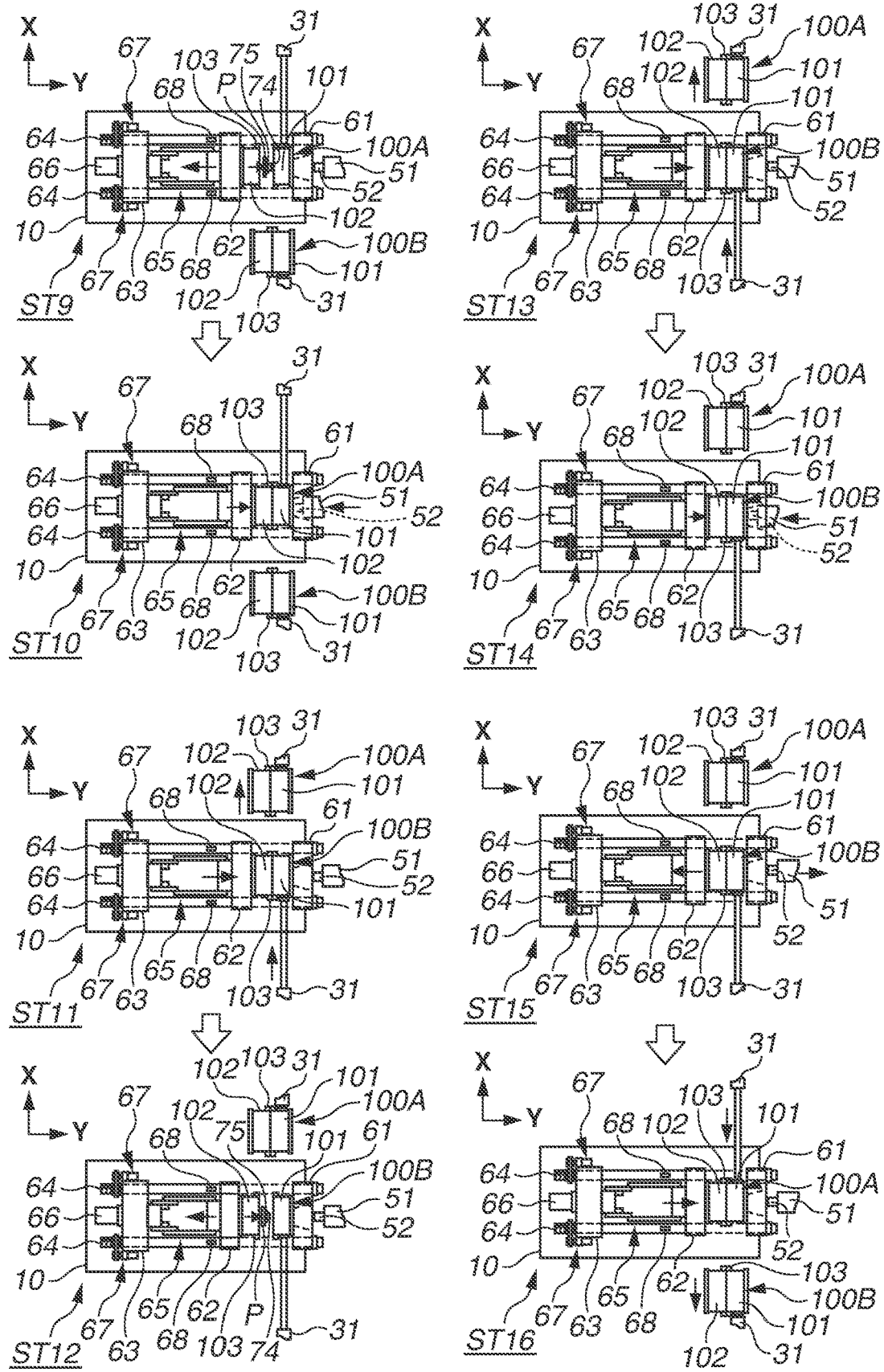
FIG. 12 illustrates a manufacturing method.

An example of the operation of the injection molding system 1 will now be described. FIG. 10A illustrates a flowchart illustrating an example of processing executed by the controller 41. FIGS. 11 and 12 illustrate diagrams illustrating an example of the operation of the injection molding system 1. The following example is provided with reference to steps in the example of the processing in FIG. 10A and states in FIGS. 11 and 12. The following example assumes a case where a molding operation is performed while replacing the metal molds 100A and 100B in the order of molding using the metal mold 100A, molding using the metal mold 100B, molding using the metal mold 100A, etc.

In step S1, initial settings are made. In step S1, operating conditions for the injection apparatus 5 and the mold clamping apparatus 6 are registered with respect to each of the metal molds 100A and 100B. For example, the operating conditions include initial values of the amount of resin per injection, the temperature, the injection speed, the mold clamping force, and the position of the movable platen 63 relative to the tie bars 64. These conditions can be the same or different between the metal molds 100A and 100B. In the first molding operation, the metal mold 100A is used, so conditions regarding the metal mold 100A are automatically set as the operating conditions. Warming of the injection cylinder 51 and the first measurement of the plasticization of resin are also initiated.

In step S2, the metal mold 100A is conveyed into the injection molding machine 2. FIG. 11 illustrates this operation. First, the motor 66 is driven, as illustrated in a state ST1, which makes the gap between the fixed platen 61 and the movable platen 62 slightly wider than the thickness (the width in the Y-axis direction) of the metal mold 100A. The controller 41 then transmits an instruction to convey the metal mold 100A into the injection molding machine 2 to the controller 42A, and the controller 42A drives the conveying unit 31, thereby conveying the metal mold 100A into the molding operation position 11. If the conveyance is completed, the controller 42A transmits a signal indicating completion of the conveyance to the controller 41. If the controller 41 receives the signal indicating completion of the conveyance, the controller 41 drives the motor 66. This brings the fixed platen 61 and the movable platen 62 into close contact with the metal mold 100A. At this time, it is not necessary to generate a mold clamping force to be generated during the molding.

In step S3, the fixing mechanisms 610 are driven, thereby locking the metal mold 100A to the fixed platen 61 and the movable platen 62. In step S4, the motor 66 is driven, thereby driving the toggle mechanism 65. The metal mold 100A is then clamped by the fixed platen 61 and the movable platen 62.

In step S5, preparations for injection into the metal mold 100 are made. In this step, the actuator 55 is driven, thereby moving the injection apparatus 5 and causing the injection nozzle 52 to touch the metal mold 100A. A state ST3 in FIG. 11 illustrates these operations. The state ST3 illustrates an injection step of injecting resin from the injection nozzle 52 including the valve pin 56 through the resin flow path in the metal mold 100A into the cavity 104 in the metal mold 100A.

The processes of steps S6 and S7 are then performed in parallel. In step S6, the injection of melted resin and pressure keeping are performed. Specifically, the injection apparatus 5 is driven, thereby filling the cavity 104 in the metal mold 100A with melted resin from the injection nozzle 52. Resin is pushed in at high pressure to compensate for a decrease in volume due to the solidification of the resin. In the process of step S6, the sensor 68 measures the actual mold clamping force. During the molding, the temperature of the metal mold 100A may gradually rise, whereby the metal mold 100A can thermally expand, and a difference can occur between the initial mold clamping force and the mold clamping force after the lapse of a period of time. Thus, the mold clamping force for the next mold clamping can be corrected based on the measurement result of the sensor 68.

The mold clamping force is adjusted by driving the motor 67*a* and adjusting the position of the movable platen 63 relative to the tie bars 64. The initial value of the position of the movable platen 63 relative to the tie bars 64 is thus corrected based on the measurement result of the sensor 68, thereby adjusting the mold clamping force. This can enhance the accuracy of the mold clamping force. The position of the movable platen 63 relative to the tie bars 64 can be adjusted at any timing (e.g., in any of steps S6 to S11 and steps S14 to S16).

In step S7, the locking of the metal mold 100 to the fixed platen 61 and the movable platen 62 by the fixing mechanisms 610 is released. It can take a period of time (e.g., several seconds) to release the locking of the metal mold 100. The locking of the metal mold 100 is released in parallel with the injection and the pressure keeping in step S6, whereby the metal mold 100 can be replaced in step S9 immediately after the completion of the process of step S6. Since the metal mold 100 is in a clamped state, the metal mold 100 does not fall, or the relative positions between the metal mold 100 and the fixed metal mold 101 and the movable metal mold 102 are not shifted, even if the locking to the platens 61 and 62 is released.

The above-described process can improve productivity. For example, presume that in a configuration in which, unlike the present exemplary embodiments, the process of step S7 is performed after the process of step S6, the interval for ejecting a resin molded product is 18 seconds, and it takes 2.6 seconds to release the locking of the metal mold in step S7. In this case, resin molded products corresponding to 4800 shots can be produced per day. In the present exemplary embodiments, if the release of the locking of the metal mold 100 is completed during the process of step S6 by executing the processes of steps S6 and S7 in parallel, the interval for ejecting a resin molded product can be shortened to 15.4 seconds. Resin molded products corresponding to 5610 shots can be produced per day, and productivity is improved by 16.9%.

In a case where each fixing mechanism 610 uses a fluidic actuator as a driving source, a spring for securing the metal mold 100 can be provided, as a countermeasure against the loss of the pressure of fluid due to the occurrence of a power outage or an apparatus trouble, in the fixing mechanism 610 so that the metal mold 100 does not come off the injection molding machine 2. If, however, such a spring is present, it is necessary to release the locking against the biasing force of the spring. Thus, it tends to take a long time to release the locking, particularly in the case of a pneumatic actuator. If the metal mold 100 is large, a stronger spring is used, and a fluidic actuator with higher output is also used. A high-output fluidic actuator typically includes a cylinder having a large diameter. Thus, it tends to take a longer time to release the locking.

In a case where each fixing mechanism 610 uses an electromagnetic clamp as a driving source, the metal mold 100 can be locked in a short time by applying a large current to a coil. It is typically necessary to gradually weaken the magnetic force by applying an alternating current to a coil to perform demagnetization for releasing the locking. Thus, it takes a period of time to release the locking.

In the present exemplary embodiments, performing the processes of steps S6 and S7 in parallel enable shortening a waiting time due to the release of the locking. The release of the locking in step S7 can be started after the injection is started and before the pressure keeping is started in step S6. The release of the locking in step S7 is completed before the pressure keeping is completed, thus a waiting time before a subsequent process (step S9) is started can be zero. If the processing time in step S6 is short, the release of the locking in step S7 is completed after the pressure keeping is completed. Even in this case, it is possible to shorten the waiting time compared to a case where the process of step S7 is executed after step S6.

After the processes of steps S6 and S7 are completed, the processes of steps S8 and S10 are performed in parallel to the process of step S9. In step S8, the measurement of the cooling time of a resin molded product in the metal mold 100A is started. In step S10, a process related to the injection apparatus 5 is performed. Examples of the process include pressure keeping suck back, nozzle shut-off, the retreat of the injection apparatus 5, and the start of the measurement of the plasticization for the next injection. A state ST4 in FIG. 11 illustrates the state where the injection apparatus 5 is caused to retreat (the state where the injection nozzle 52 is caused to retreat).

In step S9, the metal mold 100 is replaced. In this step, the motor 66 is driven, thereby driving the toggle mechanism 65. This causes the mold clamping force to disappear, the movable platen 62 slightly separates from the fixed platen 61, and a gap formed where the metal mold 100 can be replaced. The state ST4 in FIG. 11 illustrates the state where the movable platen 62 is slightly separated from the fixed platen 61. The metal molds 100A and 100B are then conveyed into/out of the injection molding machine 2. The details will be described below with reference to FIG. 10B.

The pressure keeping suck back and the nozzle shut-off are the processes of preventing melted resin from dripping when the injection nozzle 52 separates from the metal mold 100A. These processes can be performed before the movable platen 62 is slightly separated from the fixed platen 61 in step S9. The pressure keeping suck back is the process of causing the screw 51*a* to retreat after the pressure keeping, thereby reducing the pressure of resin in the injection cylinder 51 or the metal mold 100. A retreat position of the screw 51*a* in the pressure keeping suck back can be managed as an absolute position or as a relative position to the position of the screw 51*a* after the pressure keeping is completed. In another exemplary embodiment, the screw 51*a* can be caused to retreat until it is detected that the pressure of resin measured by a load cell (not illustrated) installed in the injection apparatus 5 decreases to a predetermined pressure. The nozzle shut-off is the process of closing the discharge port 52*a* of the injection nozzle 52. In the example of FIG. 8A, the valve pin 56 closes the discharge port 52*a*. This operation enables preventing resin from leaking. It is also possible to improve the accuracy of the measurement of resin for the next injection. The above-described processing provides for reducing the leakage of resin to some extent, but long stringy resin can occur between the metal mold 100 and the injection nozzle 52 depending on the type of resin or the structure of the metal mold 100. As discussed in Japanese Patent Application Laid-Open No. 2019-081346, pressure keeping suck back and nozzle shut-off can be used to prevent the leakage of resin when a metal mold and a nozzle of a molding machine are separated from each other to replace the metal mold.

In such a case of using the pressure keeping suck back and the nozzle shut-off, if the amount of pressure keeping suck back is too large, air is sucked into a flow path, and an exterior defect such as a silver streak occurs in a molded product. In a low viscosity resin such as polypropylene, resin remaining at an end of the shut-off nozzle can be stretched when the metal mold and the nozzle are separated from each other, and stringiness can occur. To prevent this, a device that blows air against the injection nozzle 52 can be installed. Blowing of air, however, can solidify any resin remaining at the discharge port 52a of the injection nozzle 52, and the solidified resin can cause a cold slug in the next molding. In the present exemplary embodiments, the valve pin 56 is inserted into the resin flow path (the sprue 115) in the metal mold 100, whereby it is possible to prevent the stringiness of resin.

FIG. 10B illustrates an example of the metal mold replacement process in step S9. In step S21, the separation of the fixed platen 61 and the movable platen 62 is started. Specifically, the motor 66 is driven, thereby driving the toggle mechanism 65, as described above. This causes the mold clamping force to disappear and moves the movable platen 62 relative to the fixed platen 61. The purpose of the movement is, as described above, to slightly separate the fixed platen 61 and the movable platen 62 from each other and form a gap where the metal mold 100 can be replaced.

The process then proceeds to step S22. In the present exemplary embodiments, the process of step S22 is started before the separation operation is completed. In step S22 in FIG. 10B, conveying the metal mold 100 inside the injection molding machine 2 and out of the injection molding machine 2 are started. It typically takes a period of time from when the movable platen 62 comes close to the amount of movement as a target or an absolute position to when the movable platen 62 converges to the target. The movable platen 62 that needs to receive a high mold clamping force is typically relatively heavy. Thus, it is difficult for the movable platen 62 to rapidly move or stop. If the movement of the movable platen 62 is approximately completed, the gap where the metal mold 100 can be replaced is formed. In the present exemplary embodiments, the replacement of the metal mold 100 is started before the separation of the fixed platen 61 and the movable platen 62 is completed, thus improving productivity. Reducing a waiting time, for example, of about 0.1 seconds to 0.3 seconds per replacement of the metal mold 100 can be achieved. If the metal mold 100 is replaced 6000 times a day by reducing a waiting time of 0.2 seconds, it is possible to reduce a waiting time of 20 minutes per day.

The start timing of conveying the metal mold 100 out of the injection molding machine 2 in step S22 is, for example, a timing corresponding to a position of about 0.5 mm to 2 mm before the movement of the movable platen 62 is completed. The start timing of conveying the metal mold 100 out from the injection molding machine 2, can be appropriately set by experiment in advance. Similarly, the start timing of conveying the metal mold 100 into the injection molding machine 2 is a timing corresponding to a position of about 0.5 mm to 2 mm before the movement of the movable platen 62 is completed. The start timing of conveying the metal mold 100 into the injection molding machine 2, can be appropriately set by experiment in advance. The timings of conveying the metal mold 100 into and out of the injection molding machine 2 can differ depending on the metal mold. Thus, a configuration can be employed where the settings of the timings can be optionally changed.

In step S23, the separation of the fixed platen 61 and the movable platen 62 is completed. In other words, the movement of the movable platen 62 is completed. The completion of the separation of the fixed platen 61 and the movable platen 62 can be monitored, and if an abnormality is confirmed, the replacement of the metal mold 100 can be stopped. Examples of an abnormality can include a case where the movable platen 62 does not reach a target position or a case where overload occurs in the conveying apparatus 3A or 3B.

In step S24, the motor 66 is driven, thereby driving the toggle mechanism 65. This starts the movement of the movable platen 62 and starts the approach of the fixed platen 61 and the movable platen 62. Also in step S24, the approach of the fixed platen 61 and the movable platen 62 is started during the movement before conveying the metal mold 100 into the injection molding machine 2 is completed, thus improving productivity. The start timing of the movement of the movable platen 62 is, for example, a timing corresponding to a position of about 0.5 mm to 3 mm before the movement of the metal mold 100 to be conveyed into the injection molding machine 2 is completed. The start timing of the movement can be appropriately set by experiment in advance. The start timing of the movement of the movable platen 62 to the position of the metal mold 100 to be conveyed into the injection molding machine 2 also differs depending on the mold closing speed, the performance of the conveying apparatus 3A or 3B, or the weight of the metal mold 100. Thus, a configuration can be employed where the setting of the start timing can be optionally changed.

In step S25 in FIG. 10B, conveying the metal mold 100 out of the injection molding machine 2 and conveying the metal mold 100 into the injection molding machine 2 are completed. In step S26, the approach of the fixed platen 61 and the movable platen 62 is completed In other words, the movement of the movable platen 62 is completed. The fixed platen 61 and the movable platen 62 come into close contact with the metal mold 100 conveyed into the injection molding machine 2. At this time, it is not necessary to generate a mold clamping force to be generated during the molding. The completion of the approach of the fixed platen 61 and the movable platen 62 can be monitored, and if an abnormality is confirmed, the replacement of the metal mold 100 can be stopped. Examples of an abnormality can include a case where the movable platen 62 does not reach a target position or a case where overload occurs in the conveying apparatus 3A or 3B. In step S27, the fixing mechanisms 610 are driven, thereby locking the metal mold 100 conveyed into the injection molding machine 2 to the fixed platen 61 and the movable platen 62.

A state ST5 in FIG. 11 illustrates the state where the metal mold 100 is replaced. More specifically, the metal mold 100A is conveyed out of the molding operation position 11 to the conveying apparatus 3A, and the metal mold 100B is conveyed into the molding operation position 11 from the conveying apparatus 3B. The controller 41 transmits an instruction to convey the metal mold 100A out of the injection molding machine 2 to the controller 42A, and the controller 42A drives the conveying unit 31, thereby conveying the metal mold 100A from the molding operation position 11. If the conveying out is completed, the controller 42A transmits a signal indicating the completion of the conveying out to the controller 41. The metal mold 100A is cooled on the conveying apparatus 3A. At this time, the closed state of the metal mold 100A is maintained by the action of a self-closing unit 103.

After or in parallel with conveying the metal mold 100A out of the injection molding machine 2, the controller 41 transmits an instruction to convey the metal mold 100B into the injection molding machine 2 to the controller 42B, and the controller 42B drives the conveying unit 31, thereby conveying the metal mold 100B into the molding operation position 11. If the conveying in is completed, the controller 42B transmits a signal indicating the completion of the conveying in to the controller 41.

If the controller 41 receives the signal indicating the completion of the conveying in, then in step S11, conditions regarding the metal mold 100B are set as the operating conditions for the molding operation. Examples of the operating conditions include the thickness (the width in the Y-axis direction) of the metal mold 100B, and the mold clamping force. A molding condition, such as the injection speed corresponding to the metal mold 100B, is also set. It can take time to switch molding conditions. As such to save time, for example, molding conditions can be switched simultaneously with the instruction to convey the metal mold 100A out of the injection molding machine 2.

In step S12, it is determined whether the molding operation on the metal molds 100A and 100B is performed for the first time. If the molding operation is performed for the first time (Yes in step S12), the processing returns to step S4. If the molding operation is performed for a second or subsequent time (No in step S12), the processing proceeds to step S13. The above-described processing is considered to correspond to the molding operation being performed for the first time. Thus, the processing returns to step S4, and the processes of steps S4 to S7 are executed on the metal mold 100B. A state ST6 in FIG. 11 illustrates the state of the processes of steps S4 and S5 on the metal mold 100B, and a state ST7 illustrates the state of the processes of step S10 and a part of step S9 on the metal mold 100B. The state ST6 illustrates an injection step of injecting resin from the injection nozzle 52 including the valve pin 56 through the resin flow path in the metal mold 100B into the cavity 104 in the metal mold 100B.

If the processes of steps S4 to S7 on the metal mold 100B are executed, then in step S9, the metal mold 100B is conveyed out of the injection molding machine 2, and the metal mold 100A is conveyed into the injection molding machine. A state ST8 in FIG. 11 illustrates the state where the metal mold 100B is conveyed out of the injection molding machine 2, and the metal mold 100A is conveyed into the injection molding machine 2. The metal mold 100B is cooled on the conveying apparatus 3B. In step S12, it is determined that the molding operation is not performed for the first time (No in step S12), and the processing proceeds to step S13.

In step S13, it is determined whether the cooling of the metal mold 100A is completed based on whether the cooling time, the measurement of which started in step S8, reaches a predetermined time. If the cooling is completed (Yes in step S13), the processes of steps S14, S16, and S17 and the process of step S15 are performed in parallel.

In step S14, the motor 66 is driven, thereby separating the movable platen 62 from the fixed platen 61. Since the fixed metal mold 101 is fixed to the fixed platen 61 by the fixing mechanisms 610, and the movable metal mold 102 is fixed to the movable platen 62 by the fixing mechanisms 610, the movable metal mold 102 separates from the fixed metal mold 101, thereby opening the metal mold 100A.

In step S16, the ejection machine 7 is driven, thereby ejecting the resin molded product remaining on the movable metal mold 102 side of the metal mold 100A. Then, the resin molded product is conveyed from the injection molding machine 2. A state ST9 in FIG. 12 illustrates the operation of opening the metal mold 100A and the step of ejecting a resin molded product P from the metal mold 100A. The suction head 74 is moved to a position where the chuck plate 75 is opposed to the resin molded product P, and the resin molded product P is secured by suction.

In step S15, preparations for the next injection operation on the metal mold 100A are made. This step is similar to step S5, and thus, a detailed description is omitted herein. In step S17, the metal mold 100A is clamped. A state ST10 in FIG. 12 illustrates the step of injecting resin from the injection nozzle 52 through the resin flow path in the metal mold 100A into the cavity 104 in the metal mold 100A in the state where the metal mold 100A is clamped. After the resin molded product P is ejected from the metal mold 100A in the state ST9, the metal mold 100 is not replaced, and resin is injected into the metal mold 100A in the state ST10. Thus, it is possible to efficiently go through steps. The processing then returns to steps S6 and S7. Thus, the processing proceeds in the order of the injection and the pressure keeping on the metal mold 100A, the replacement of the metal mold 100 (the conveying out of the metal mold 100A and the conveying in of the metal mold 100B), and the ejection of a resin molded product of the metal mold 100B.

A state ST11 in FIG. 12 illustrates the replacement of the metal mold 100. A state ST12 in FIG. 12 illustrates the step of ejecting a resin molded product P from the metal mold 100B. Operations are then performed as illustrated in states ST13 to ST16 similar to the states ST5 to ST8 in FIG. 11. After the state ST16, operations are performed as illustrated in states similar to the states ST9 to ST12 as described above.

As described above, according to the present exemplary embodiments, the metal mold 100 is cooled on the conveying apparatus 3A or 3B outside the injection molding machine 2. During the cooling of the metal mold 100A or 100B, the injection molding machine 2 then performs processes in the order of the ejection of a resin molded product, the mold clamping, and the injection and the pressure keeping, on the metal mold not in the process of cooling. Since the injection molding machine 2 performs the mold opening and the ejection of a resin molded product, the conveying apparatuses 3A and 3B do not need to have a mold opening function and the function of ejecting a resin molded product. Thus, it is possible to prevent an increase in the cost of the system and also manufacture resin molded products P while replacing the plurality of metal molds 100A and 100B on the single injection molding machine 2.

In particular, if the cooling time required for the metal mold 100A or 100B is greater than or equal to a time required to perform all molding operation steps, productivity improves twofold at maximum as compared with a normal molding operation. The molding operation steps include the start of the metal mold replacement step, the step of ejecting the other metal mold, the injection step, the pressure keeping step, and completion of the second metal mold replacement step. That is, there is an advantage that high productivity can be achieved in addition to the prevention of an increase in the cost. Many resin molded products used in exterior components and mechanism components of automobiles, household electrical appliances, and office machines have a thickness of several millimeters to ensure strength. Thus, a cooling step can typically take up the longest time from all the molding operation steps. For example, it is not uncommon that the cooling time reaches 50% to 70% of the time for all the molding operation steps. The above-described exemplary embodiments are particularly effective in improving the productivity of a resin molded product of this type.

Even if a thickness of a resin molded part is relatively thin, e.g., about 1 mm, the cooling step can still tend to be long in the case of a component that requires high dimensional accuracy, or a resin molded product using a resin that requires high temperature as a metal mold temperature or a crystalline resin that takes long to cool. In the above-described exemplary embodiments, it is possible to achieve close to a two-fold increase in productivity while a wide range of resin molded products satisfy excellent external appearances and dimensional accuracy.

The metal molds 100A and 100B can be metal molds for molding the same resin molded product or can be metal molds for molding different resin molded products. Regardless of whether the resin molded product to be molded is the same, the thicknesses in the Y-axis direction or the mold clamping forces of the metal molds 100A and 100B can differ from each other. In the present exemplary embodiments, with the adjustment mechanism 67, the fixed position of the movable platen 63 relative to the tie bars 64 can be changed, and after the metal mold 100 is replaced (step S9 in FIG. 10A), the settings are changed (step S11 in FIG. 10A). Thus, it is possible to make the settings of mold clamping corresponding to each of the metal molds 100A and 100B.

In a case where the metal molds 100A and 100B are metal molds for molding different resin molded products, it can be necessary to replace the chuck plate 75 with a chuck plate corresponding to the type of the resin molded product. This can take time regardless of whether replacement of the chuck plate 75 is manual or automatic. To address this, the chuck plate 75 including holding units corresponding to the different resin molded products can be used. The chuck plate 75 can then be displaced based on the metal mold 100 from which the resin molded product is ejected, and the holding unit corresponding to the resin molded product can be opposed to the resin molded product.

The above description has discussed an example where the two metal molds 100A and 100B are replaced. In another exemplary embodiment, three or more metal molds can be replaced. For example, metal molds 100A, 100B, and 100C are replaced. In this example, the metal mold 100A is conveyed into the injection molding machine 2, a resin molded product is ejected, the metal mold 100A is clamped, and injection and pressure keeping are performed. The metal mold 100A is conveyed out of the injection molding machine 2, the metal mold 100B is conveyed into the injection molding machine 2, a resin molded product is ejected, the metal mold 100B is clamped, and injection and pressure keeping are performed. The metal mold 100B is conveyed out of the injection molding machine 2, the metal mold 100C is conveyed into the injection molding machine 2, a resin molded product is ejected, the metal mold 100C is clamped, and injection and pressure keeping are performed. The metal mold 100C is conveyed out of the injection molding machine 2, the metal mold 100A is conveyed into the injection molding machine 2, a resin molded product is ejected, the metal mold 100A is clamped, and injection and pressure keeping are performed. From this point onward, the above-described procedure is repeated.

As a conveying apparatus for the three metal molds 100A, 100B, and 100C, it is possible to employ an apparatus including an actuator that arranges the three metal molds 100A, 100B, and 100C in the X-axis direction, supports the three metal molds 100A, 100B, and 100C by a common supporting body, and moves the supporting body in the X-axis direction. In the case of this configuration example, when the metal mold 100C is conveyed out of the injection molding machine 2 and the metal mold 100A is conveyed carried into the injection molding machine 2, the metal mold 100B temporarily passes through the injection molding machine 2.

Conveying out and into the injection molding machine 2 of the metal mold 100 are performed in a short time, resulting in achieving high productivity. A high-output unit can be employed as the conveying unit 31, but that could result in a cost increase. To address this, a balancer device that assists the movement of the metal mold 100 using the gravity of a weight can be provided.

In another exemplary embodiment, while using the same injection molding machine 2, a metal mold is not replaced, and an injection step, an intermediate step, and the ejection of a resin molded product can be repeated on a single metal mold.

The above-described present exemplary embodiments have discussed an example where a single injection apparatus 5 is installed in the injection molding machine 2. In another exemplary embodiment, an injection molding machine 2 including two or more injection apparatuses can be used. In this embodiment, molding could be performed without necessarily needing to change molding conditions for each injection apparatus, and molding could be performed using different types of materials in a plurality of metal molds.

In the above-described present exemplary embodiments, a typical injection molding method including injection, pressure keeping, cooling, and ejection steps is applied to the metal mold 100. In another exemplary embodiment, known molding techniques, such as foam molding, gas-assisted molding, or heat and cool molding, can be combined together for at least one metal mold. In general, these molding methods have long cooling times. Thus, molding using these molding methods in combination with the above-described present exemplary embodiments is advantageous in improving productivity.

During a molding cycle, a temperature regulator can always be connected to the metal mold 100 via piping. For example, the temperature regulator circulates a fluid, such as cooling water, between the metal mold 100 and the temperature regulator, thereby regulating the temperature of the metal mold 100. The temperature regulator can be a temperature regulator common to both the metal molds 100A and 100B or can be provided for each of the metal molds 100A and 100B respectively. When a temperature regulator is provided for each of the metal molds 100A and 100B respectively, it is possible to independently regulate the temperatures of the metal molds 100A and 100B respectively.

During a molding cycle, electrical wiring can always be connected to the metal mold 100. Examples of the electrical wiring include wiring for supplying power to the hot runner and wiring for a sensor signal from a thermocouple or a limit switch.

The insertion and the extraction of the valve pin in the above-described intermediate step are also applicable to a stack mold-type injection molding metal mold such as that discussed in Japanese Patent Application Laid-Open No. 2003-127186. In Japanese Patent Application Laid-Open No. 2003-127186, a hot runner nozzle [9] corresponds to the injection nozzle 52 according to the above exemplary embodiments, and an intermediate mold [2] corresponds to the metal mold 100 according to the above exemplary embodiments. An exemplary embodiment discussed in Japanese Patent Application Laid-Open No. 2003-127186 is changed such that, when a movable pin [12] closes a hot runner nozzle port [10], the movable pin [12] protrudes further than an end of the hot runner nozzle [9] when the movable pin [12] opens the hot runner nozzle port [10].

In the injection step, resin is injected from the hot runner nozzle [9] in a fixed mold [1] including the movable pin [12] through resin paths [6, 11, 18] in the intermediate mold [2] into a molding cavity [5] in a moving mold [3]. In the intermediate step, the movable pin [12] of the hot runner nozzle [9] is inserted into the resin path [18], and the movable pin [12] of the hot runner nozzle [9] is extracted from the resin path [18].

According to the present exemplary embodiments, it is possible to provide a technique advantageous in preventing the leakage of resin.

The above exemplary embodiments can be appropriately changed without departing from their technical ideas. The disclosed content of the specification includes not only the descriptions of the specification but also all matters that can be understood from the specification and the drawings attached to the specification.

The disclosed content of the specification includes a complement of individual concepts described in the specification. That is, for example, if the specification states that "A is larger than B", and even if the specification omits the statement that "A is not larger than B", the specification can be said to state that "A is not larger than B". This is because the statement that "A is larger than B" is based on the premise of the consideration that "A is not larger than B".

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2020-208138, filed Dec. 16, 2020, which is hereby incorporated by reference herein in its entirety.

What is claimed is:

1. A method for manufacturing an article using injection molding, the method comprising:
   a first step of injecting resin from an injection nozzle having a valve pin via a resin flow path in a first mold into a cavity in the first mold;
   a second step of, after the first step, inserting the valve pin into the resin flow path, extracting the valve pin from the resin flow path, and starting to increase a distance between the injection nozzle and the first mold after extracting the valve pin; and
   a third step of, after starting to increase the distance between the injection nozzle and the first mold, injecting resin from the injection nozzle via a resin flow path in a second mold into a cavity in the second mold.

2. The method according to claim 1, wherein in the second step, the injection nozzle and the first mold are contacting each other during extraction of the valve pin.

3. The method according to claim 1, wherein the third step further comprises injecting resin present in a resin flow path in the injection nozzle in the second step.

4. The method according to claim 1, wherein the first mold has a cold runner structure.

5. The method according to claim 1, wherein the first mold has a hot runner structure.

6. The method according to claim 1, wherein the valve pin of the injection nozzle is a first valve pin and the first mold includes a second valve pin.

7. The method according to claim 6, wherein the second step further comprises, inserting the second valve pin into a discharge port of the injection nozzle and extracting the second valve pin from the discharge port.

8. The method according to claim 7, wherein the second step further comprises extracting the second valve pin while maintaining a state where the first valve pin and the second valve pin are contacting each other.

9. The method according to claim 6, wherein the second step further comprises an end of the first valve pin and an end of the second valve pin fitting with each other.

10. The method according to claim 1, further comprising a fourth step of, after the third step, ejecting a resin molded product from the first mold.

11. The method according to claim 10, further comprising:
    a fifth step of, after the fourth step, injecting resin from the injection nozzle via the resin flow path in the first mold into the cavity in the first mold; and
    a sixth step of, after the fifth step, ejecting a resin molded product from the second mold.

12. The method according to claim 1, wherein the second step further comprises closing a portion between a resin flow path in the injection nozzle and the resin flow path in the mold.

13. The method according to claim 1, further comprising:
    conveying, between the second step and the third step, the first mold and the second mold in a first direction (X), wherein in the second step, the first mold is moved in the second direction (Y) other than the first direction.

14. The method according to claim 13, further comprising:
    a third step of, after the second step, injecting resin from the injection nozzle via a resin flow path in another mold into a cavity in the another mold.

* * * * *